(12) United States Patent
Noguchi

(10) Patent No.: US 10,819,443 B2
(45) Date of Patent: Oct. 27, 2020

(54) OPTICAL COMMUNICATIONS SYSTEM AND OPTICAL FREQUENCY CONTROL METHOD

(71) Applicant: NEC Corporation, Minato-ku, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,632

(22) PCT Filed: Mar. 5, 2018

(86) PCT No.: PCT/JP2018/008249
§ 371 (c)(1),
(2) Date: Sep. 3, 2019

(87) PCT Pub. No.: WO2018/164035
PCT Pub. Date: Sep. 13, 2018

(65) Prior Publication Data
US 2020/0014468 A1    Jan. 9, 2020

(30) Foreign Application Priority Data

Mar. 6, 2017    (JP) ................................. 2017-041280

(51) Int. Cl.
*H04B 10/67* (2013.01)
*H04B 10/079* (2013.01)
(Continued)

(52) U.S. Cl.
CPC ....... *H04B 10/675* (2013.01); *H04B 10/0799* (2013.01); *H04B 10/07957* (2013.01);
(Continued)

(58) Field of Classification Search
None
See application file for complete search history.

(56) References Cited

U.S. PATENT DOCUMENTS

2011/0069975 A1* 3/2011 Liu ................ H04B 10/61
398/202
2015/0023674 A1* 1/2015 Salsi ............. H04B 10/61
398/202
(Continued)

FOREIGN PATENT DOCUMENTS

JP    2015-513847 A    5/2015
JP    2015-156659 A    8/2015
(Continued)

OTHER PUBLICATIONS

International Search Report for PCT Application No. PCT/JP2018/008249, dated May 22, 2018.

*Primary Examiner* — Darren E Wolf

(57) ABSTRACT

The receiving-side system (10) includes a smaller number of optical reception front ends (12) than the number of a plurality of wavelength-multiplexed subcarrier signals. Each of the optical reception front ends (12) is configured to receive two or a plurality subcarrier signals of the plurality of subcarrier signals. A frequency offset monitoring unit (22) monitors frequency offsets of the respective subcarrier signals received by the optical reception front end (12). A light source frequency control unit (24) controls at least one of a light source frequency of the transmitting-side system (2) and a light source frequency of the receiving-side system (10) based on a result of the monitoring performed by the frequency offset monitoring unit (22).

14 Claims, 15 Drawing Sheets

(51) Int. Cl.
*H04B 10/61* (2013.01)
*H04J 14/02* (2006.01)
*H04B 10/60* (2013.01)
*H04B 10/50* (2013.01)

(52) U.S. Cl.
CPC ...... *H04B 10/6165* (2013.01); *H04J 14/0298* (2013.01); *H04B 10/50* (2013.01); *H04B 10/60* (2013.01)

(56) References Cited

U.S. PATENT DOCUMENTS

2015/0381276 A1* 12/2015 Saito ............... H04B 10/07957
398/34
2016/0065305 A1    3/2016 Endo et al.
2017/0026114 A1*  1/2017 Sugitani ........... H04B 10/07953

FOREIGN PATENT DOCUMENTS

| JP | 2016-010040 A | 1/2016 |
| JP | 2016-051988 A | 4/2016 |
| JP | 2017-011501 A | 1/2017 |
| JP | 2017-028451 A | 2/2017 |

* cited by examiner

OPTICAL COMMUNICATIONS SYSTEM AND OPTICAL FREQUENCY CONTROL METHOD

This application is a National Stage Entry of PCT/JP2018/008249 filed on Mar. 5, 2018, which claims priority from Japanese Patent Application 2017-041280 filed on Mar. 6, 2017, the contents of all of which are incorporated herein by reference, in their entirety.

TECHNICAL FIELD

The present invention relates to an optical communications system and an optical frequency control method.

BACKGROUND ART

In recent years, multilevel modulation systems such as Quadrature Phase Shift Keying (QPSK) or 16 Quadrature Amplitude Modulation (QAM) have been put into practical use in high-capacity trunk optical communications of over 100 Gbps by adopting digital coherent systems. At present, research and development of higher-order multilevel modulation systems such as 32 QAM/64 QAM are being actively conducted in order to implement a further increase in capacity. Further, in a high-capacity transmission system for implementing a capacity of 400 Gbps/1 Tbps, a subcarrier multiplexing system in which a plurality of subcarrier signals are bundled into one channel has been studied while its feasibility is taken into consideration.

In relation to the aforementioned techniques, Patent Literature 1 discloses a system in which a plurality of transmitters and receivers are implemented. In such a system, how to implement a plurality of transmitters and receivers to reduce the size and power of the system is the key to putting the system into practical use. Therefore, optical integration technology using silicon photonics, standardization of small optical modules such as Centum gigabit Form Factor Pluggable (CFP) 4 and CFP 8, and the like have been actively performed.

CITATION LIST

Patent Literature

Patent Literature 1: Japanese Unexamined Patent Application Publication No. 2017-11501

SUMMARY OF INVENTION

Technical Problem

In order to address the aforementioned problem, the number of optical reception front ends can be reduced below the number of subcarrier signals in the entire system if a plurality of subcarrier signals are received by one optical reception front end (RxFE), and thus it is possible to be integrated, reduced in size, and reduced in power. However, when band characteristics (a frequency band) of the optical reception front end cannot be sufficiently achieved, the bandwidth of a plurality of subcarrier signals may exceed the band characteristics of the optical reception front end if the frequency drift that has occurred in the light sources on the transmitting and receiving sides causes frequency offsets. In such a case, there is a possibility that a plurality of subcarrier signals cannot be appropriately cut out (extracted). Accordingly, the reception characteristics may be degraded.

The present invention has been made in view of the aforementioned problems and its object is to provide an optical communications system and an optical frequency control method capable of preventing, even when the band characteristics of the optical reception front end cannot be sufficiently achieved, reception characteristics from being degraded even if the number of optical reception front ends is reduced below the number of subcarrier signals.

Solution to Problem

An optical communications system according to the present invention includes: a transmitting-side system configured to wavelength-multiplex a plurality of subcarrier signals and transmit the wavelength-multiplexed subcarrier signals; a receiving-side system configured to receive the plurality of wavelength-multiplexed subcarrier signals; a light source frequency control system configured to control at least one of a light source frequency of the transmitting-side system and a light source frequency of the receiving-side system, in which the receiving-side system includes an optical reception front end, the number of the optical reception front end being smaller than the number of the wavelength-multiplexed subcarrier signals, each of the optical reception front end being configured to receive two or more subcarrier signals of the plurality of subcarrier signals, the light source frequency control system includes frequency offset monitoring means for monitoring frequency offsets of the respective subcarrier signals received by the optical reception front end; and light source frequency control means for controlling at least one of a light source frequency of the transmitting-side system and a light source frequency of the receiving-side system based on a result of the monitoring performed by the frequency offset monitoring means.

Further, an optical frequency control method includes: receiving, in the receiving-side system, a plurality of subcarrier signals wavelength-multiplexed and transmitted by the transmitting-side system by using an optical reception front end, the number of the optical reception front end being smaller than the number of the wavelength-multiplexed subcarrier signals; causing each of the optical reception front end to receive two or more subcarrier signals of the plurality of subcarrier signals; monitoring frequency offsets of the respective subcarrier signals received by the optical reception front end; and controlling at least one of a light source frequency of the transmitting-side system and a light source frequency of the receiving-side system based on a result of the monitoring of the frequency offsets.

Advantageous Effects of Invention

According to the present invention, it is possible to provide an optical communications system and an optical frequency control method capable of preventing, even when the band characteristics of the optical reception front end cannot be sufficiently achieved, reception characteristics from being degraded even if the number of optical reception front ends is made smaller than the number of subcarrier signals.

DESCRIPTION OF EMBODIMENTS

Outline of Example Embodiments According to the Present Disclosure

Figure 1:
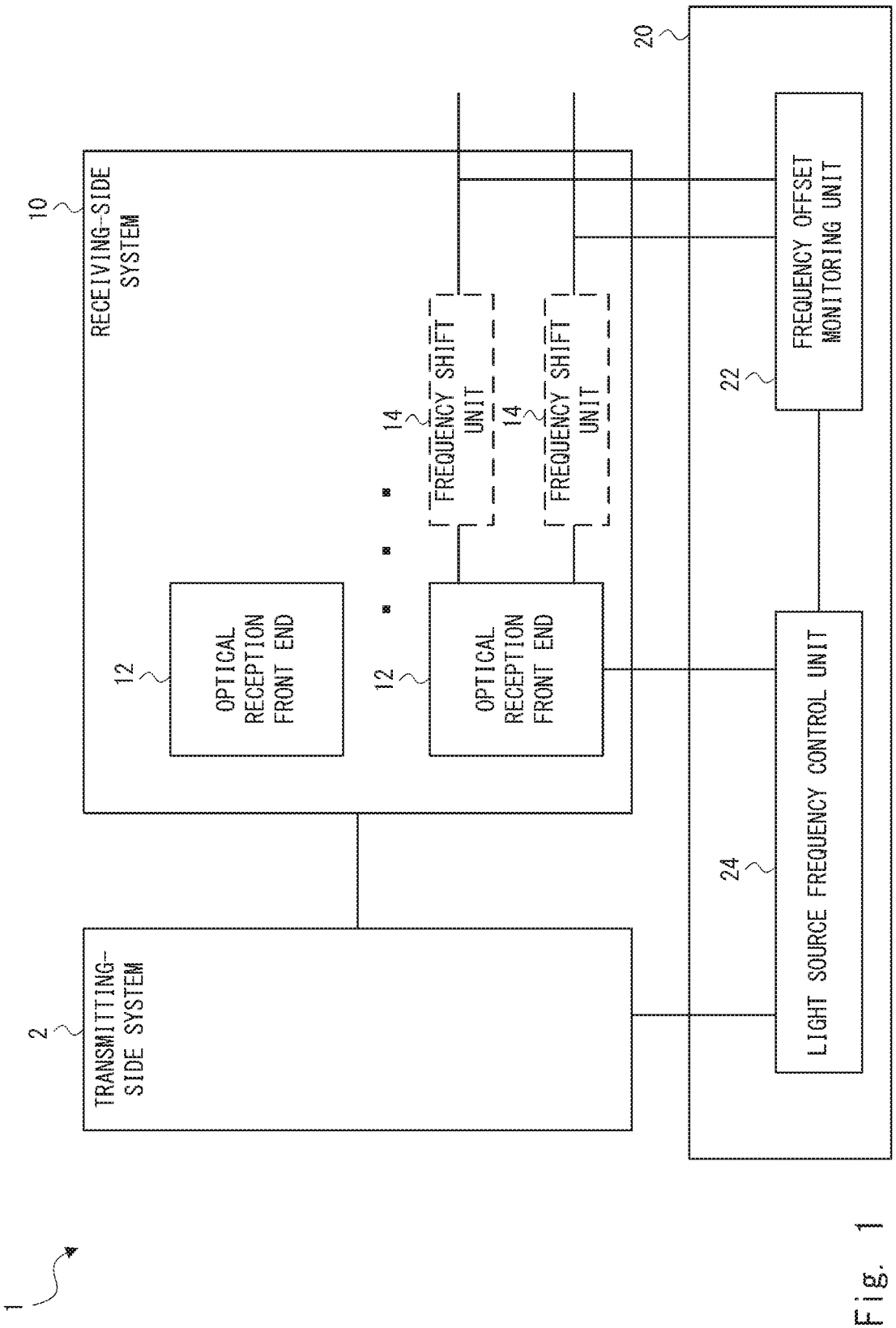
FIG. 1 is a diagram showing an outline of an optical communications system according to an example embodiment of the present invention.

Prior to describing example embodiments according to the present disclosure, an outline of the example embodiments according to the present disclosure is given. FIG. 1 is a diagram showing an outline of an optical communications system 1 according to an example embodiment of the present disclosure. As shown in FIG. 1, the optical communications system 1 includes a transmitting-side system 2, a receiving-side system 10, and a light source frequency control system 20. The transmitting-side system 2 wavelength-multiplexes a plurality of subcarrier signals and transmits the wavelength-multiplexed subcarrier signals. The receiving-side system 10 receives a plurality of wavelength-multiplexed subcarrier signals. The light source frequency control system 20 controls at least one of a light source frequency of the transmitting-side system 2 and a light source frequency of the receiving-side system 10.

The receiving-side system 10 includes a smaller number of optical reception front ends 12 than the number of wavelength-multiplexed subcarrier signals. Each optical reception front end 12 receives two or more subcarrier signals of the plurality of subcarrier signals. Note that the receiving-side system 10 may include a frequency shift unit 14 (frequency shift means) for applying frequency shifts corresponding to the respective subcarrier signals received by the optical reception front end 12 to the subcarrier signals based on the channel spacing of the plurality of subcarrier signals wavelength-multiplexed by the transmitting-side system 2.

The light source frequency control system 20 has a frequency offset monitoring unit 22 (frequency offset monitoring means) and a light source frequency control unit 24 (light source frequency control means). The frequency offset monitoring unit 22 monitors frequency offsets of the respective subcarrier signals received by the optical reception front end 12. The light source frequency control unit 24 controls at least one of a light source frequency of the transmitting-side system 2 and a light source frequency of the receiving-side system 10 based on a result of the monitoring performed by the frequency offset monitoring unit 22.

The optical communications system 1 according to this example embodiment is configured as described above, and it is thus possible to appropriately control a light source frequency deployed on the transmitting and receiving side and arrange a plurality of subcarrier signals most effectively in the frequency band of the optical reception front end even when the band characteristics of the optical reception front end cannot be sufficiently achieved, thereby enabling the plurality of subcarrier signals to be appropriately extracted. Accordingly, it is possible to prevent reception characteristics from being degraded even if the number of optical reception front ends is reduced below the number of subcarrier signals. Note that using an optical frequency control method which can be implemented in the optical communications system 1 also makes it possible to prevent reception characteristics from being degraded even if the number of optical reception front ends is reduced below the number of subcarrier signals.

First Example Embodiment

Figure 2:
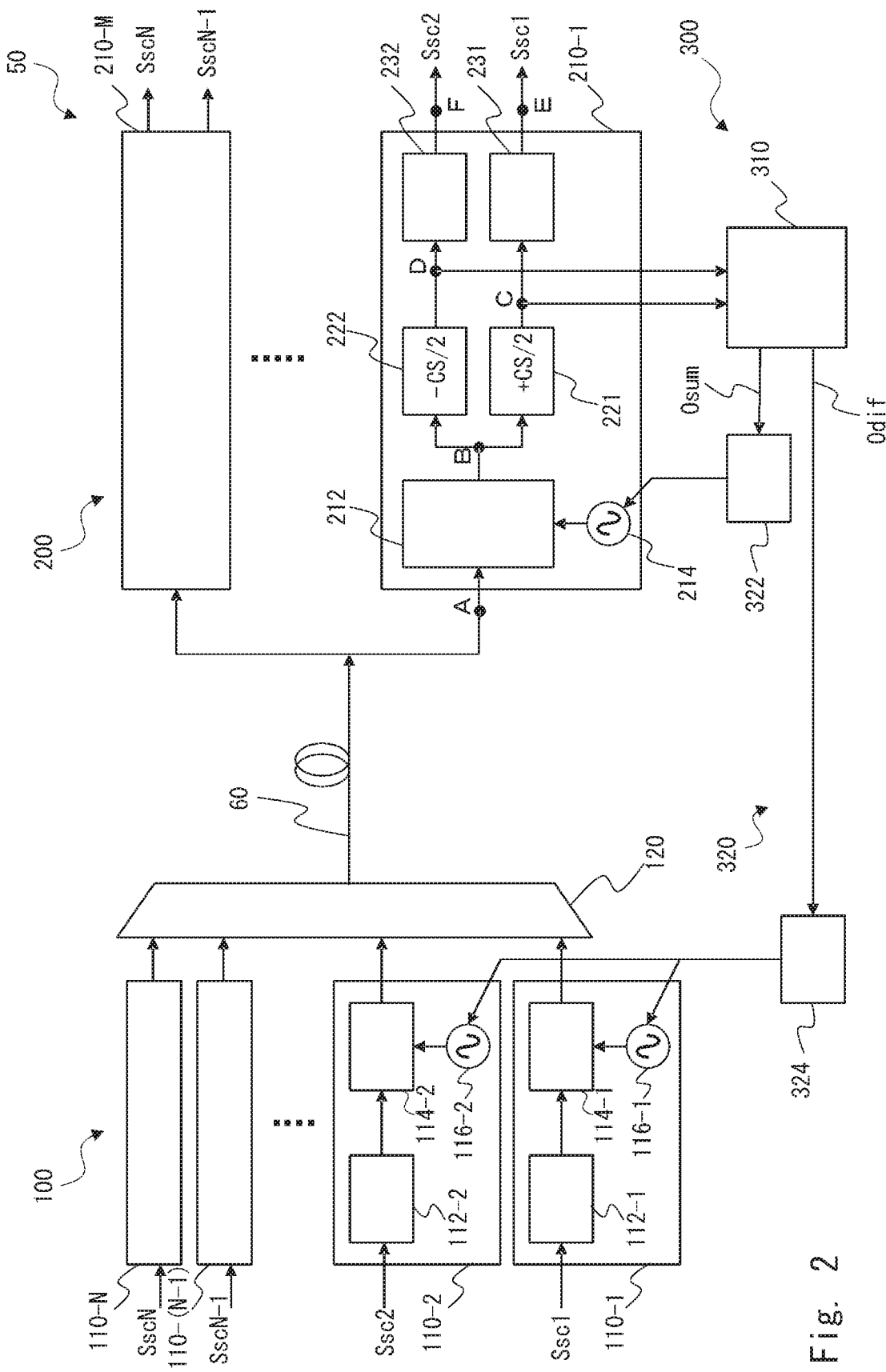
FIG. 2 is a diagram showing a configuration of the optical communications system according to a first example embodiment.

FIG. 2 is a diagram showing a configuration of an optical communications system 50 according to a first example embodiment. The optical communications system 50 according to the first example embodiment has a configuration of a digital optical communications system of a multiple subcarriers collective reception system that can reduce the number of optical reception front ends. It is assumed, in the example of FIG. 2, that N subcarrier signals are transmitted. Note that the example described below indicates a configuration in which two subcarrier signals are collectively received by one optical reception front end. In this example, only the part of the description related to transmission and reception of two subcarrier signals of N subcarrier signals is described in order to simplify the description.

The optical communications system 50 includes a transmitting-side system 100, a receiving-side system 200, and a light source frequency control system 300. The transmitting-side system 100 and the receiving-side system 200 are connected to each other through an optical transmission line 60. Note that the directions indicated by the arrows shown in figures indicate the main directions in which a signal etc. flows. However, these are only examples and flows in directions opposite to those indicated in figures are not excluded. That is, the unidirectional arrows shown in figures clearly indicate the directions in which a certain signal (data) flows, and bidirectionality is not excluded.

The transmitting-side system 100 includes N optical transmitters 110-1 to 110-N and a multiplexer 120. The optical transmitters 110-1 to 110-N receive transmission subcarrier signals Ssc1 to SscN, respectively. The optical transmitter 110-1 includes a transmission digital processing unit 112-1, an optical transmission front end 114-1, and a transmission light source 116-1. Similarly, the optical transmitter 110-2 includes a transmission digital processing unit 112-2, an optical transmission front end 114-2, and a transmission light source 116-2. The same applies to the other optical transmitters 110-3 to 110-N. Note that hereinafter, when a plurality of components such as the optical transmitters 110-1 to 110-N are described without any distinction between them being made, they may be simply described as the optical transmitter 110. While the processing of the optical transmitter 110-1 will be mainly described below, the same applies to the other optical transmitters 110.

The transmission subcarrier signal Ssc1 is input to the transmission digital processing unit 112-1. The transmission digital processing unit 112-1 performs appropriate signal processing such as modulation processing and equalization processing on the transmission subcarrier signal Ssc1. The transmission digital processing unit 112-1 transmits the transmission subcarrier signal Ssc1 on which the signal processing is performed to the optical transmission front end 114-1. The optical transmission front end 114-1 converts (modulates) the transmission subcarrier signal Ssc1 to an optical signal by using the transmission light source 116-1. The optical transmission front end 114-1 transmits the transmission subcarrier signal Ssc1 that has been converted to the optical signal to the multiplexer 120. Not that the optical transmission front end 114-1 includes a digital-analog converter that converts a digital signal to an analog signal.

Similarly, a transmission subcarrier signal Ssc2 is input to the transmission digital processing unit 112-2, and appropriate signal processing such as modulation processing and equalization processing is performed thereon. Then, the transmission subcarrier signal Ssc2 is converted to an optical signal through the optical transmission front end 114-2 and is sent to the multiplexer 120. The multiplexer 120 is composed of, for example, an optical coupler. The multiplexer 120 wavelength-multiplexes the transmission subcarrier signals Ssc1 to SscN converted to the optical signals and multiplexes the transmission subcarrier signals Ssc1 to SscN. Then, the multiplexer 120 transmits the multiplexed (wavelength-multiplexed) transmission subcarrier signals Ssc to the receiving-side system 200 through the optical transmission line 60.

Note that a predetermined frequency difference is provided between the light frequencies of the transmission light sources 116-1 and 116-2. Accordingly, by modulating the respective subcarrier signals by the optical transmission front ends 114-1 and 114-2, the respective subcarrier signals are wavelength-multiplexed by the multiplexer 120 at a desired channel spacing (CS). The multiplexer 120 collectively multiplexes N subcarrier signals including other subcarrier signals converted to optical signals by processing similar to that described above, thereby generating a subcarrier-multiplexed signal in which N subcarrier signals are combined into one channel. Note that for the transmission light source 116, a case may be conceivable where a light source of which the frequency can be externally changed is used by using a variable wavelength laser as generally represented by an Integrable Tunable Laser Assembly (ITLA) module.

The receiving-side system 200 includes M optical receivers 210-1 to 210-M. The optical receiver 210 processes the respective subcarrier signals Ssc. Here, M<N holds. That is, the number of optical receivers 210 is smaller than that of subcarrier signals Ssc. Note that as described above, M is half of N (M=N/2 when N is an even number, M=(N+1)/2 when N is an odd number) when one optical receiver 210 processes two subcarrier signals Ssc. In the example described below, a case is described where one optical receiver 210 processes two subcarrier signals Ssc. However, one optical receiver 210 may process three or more subcarrier signals Ssc.

The optical receiver 210 includes an optical reception front end 212, a reception local oscillate (LO) light source 214, a frequency shift unit 221 and a frequency shift unit 222, a reception digital signal processing unit 231, and a reception digital signal processing unit 232. The receiving-side system 200 branches (distributes) the subcarrier-multiplexed signals (a plurality of subcarrier signals Ssc) received through the optical transmission line to a plurality of optical receivers 210. The receiving-side system 200 may distribute the subcarrier-multiplexed signals to the respective optical receivers 210 in the same manner, for example, by using a distributor. Note that in the following description, while the optical receiver 210-1 that processes the subcarrier signals Ssc1 and Ssc2 is described, the same applies to the other optical receivers 210.

The optical reception front end 212 includes an analog-digital converter (AD converter) that converts an analog signal to a digital signal, and performs AD conversion on reception signals (subcarrier-multiplexed signals). Further, the optical reception front end 212 includes a mixer. The optical reception front end 212 cuts out the signals corresponding to the transmission subcarrier signals Ssc1 and Ssc2 from the branched reception signals due to the effect of interference with the reception LO light from the reception LO light source 214. That is, in this example embodiment, a single optical reception front end 212 processes two subcarrier signals Ssc. Specifically, the optical reception front end 212 extracts, using the optical frequency of the reception LO light source 214 as the center, the signals corresponding to the transmission subcarrier signals Ssc1 and Ssc2 from the subcarrier-multiplexed reception signals in accordance with the band characteristic (bandwidth) of the optical reception front end 212. Then, the optical reception front end 212 transmits the extracted signals to the two frequency shift units 221 and 222. The details will be described later. Note that for the reception LO light source 214, a case may be conceivable where a light source of which the frequency can be externally changed is used by using a variable wavelength laser as generally represented by an ITLA module.

The reception signals processed by the optical reception front end 212 are distributed (branched) to the frequency shift unit 221 that processes the subcarrier signal Ssc1 and the frequency shift unit 222 that processes the subcarrier signal Ssc2 in order to perform demodulation processing separately on the respective subcarrier signals Ssc. The frequency shift units 221 and 222 apply frequency shifts of +CS/2 and −CS/2, respectively, to the respective reception signals. The frequency shift unit 221 transmits the reception signals to which the frequency shifts of +CS/2 have been applied to the reception digital signal processing unit 231. The frequency shift unit 222 transmits the reception signals to which the frequency shifts of −CS/2 have been applied to the reception digital signal processing unit 232.

The reception digital signal processing units 231 and 232 perform, on the reception signals, signal processing such as compensation for wavelength dispersion received at the optical transmission line 60, Nyquist filter processing, polarization separation processing, and polarization mode dispersion compensation. Then, the reception digital signal processing unit 231 restores the reception subcarrier signal Ssc1 corresponding to the transmission subcarrier signal Ssc1. Similarly, the reception digital signal processing unit 232 restores the reception subcarrier signal Ssc2 corresponding to the transmission subcarrier signal Ssc2. The details will be described later.

The light source frequency control system 300 performs optimal control of a light source frequency of the transmission light source 116 provided in the transmitting-side system 100 and a light source frequency of the reception LO light source 214 provided in the receiving-side system 200. The light source frequency control system 300 includes a frequency offset monitor unit 310, a reception LO light source frequency control unit 322, and a transmission light source frequency control unit 324. Further, the reception LO light source frequency control unit 322 and the transmission light source frequency control unit 324 configure a light source frequency control unit 320.

The outputs of the frequency shift units 221 and 222 are branched to the frequency offset monitor unit 310. In other words, the frequency offset monitor unit 310 extracts the outputs of the frequency shift units 221 and 222. The frequency offset monitor unit 310 monitors each of a frequency offset of the signal at a point C corresponding to the subcarrier signal Ssc1 and a frequency offset of the signal at a point D corresponding to the subcarrier signal Ssc2, and generates results of the monitoring. Further, the frequency offset monitor unit 310 generates frequency offset sum information Osum indicating the sum of the two results of the monitoring. Further, the frequency offset monitor unit 310 generates frequency offset difference information Odif indicating the difference between the two results of the monitoring. Then, the frequency offset monitor unit 310 transmits the frequency offset sum information Osum to the reception LO light source frequency control unit 322. Further, the frequency offset monitor unit 310 transmits the frequency offset difference information Odif to the transmission light source frequency control unit 324.

The reception LO light source frequency control unit 322 controls the light source frequency of the reception LO light source 214 based on the frequency offset sum information Osum. Further, the transmission light source frequency control unit 324 controls optical frequencies of the transmission light sources 116-1 and 116-2 in the directions of addition and subtraction different from each other based on the frequency offset difference information Odif. The details will be described later.

Next, the operation of the receiving-side system 200 of the optical communications system 50 according to the first example embodiment is described. FIGS. 3 to 8 show signal spectrum images in the case where optical frequencies of the light sources (i.e., the transmission light source 116 and the reception LO light source 214) provided in the transmitting-side system 100 and the receiving-side system 200 are ideally arranged.

Figure 3:
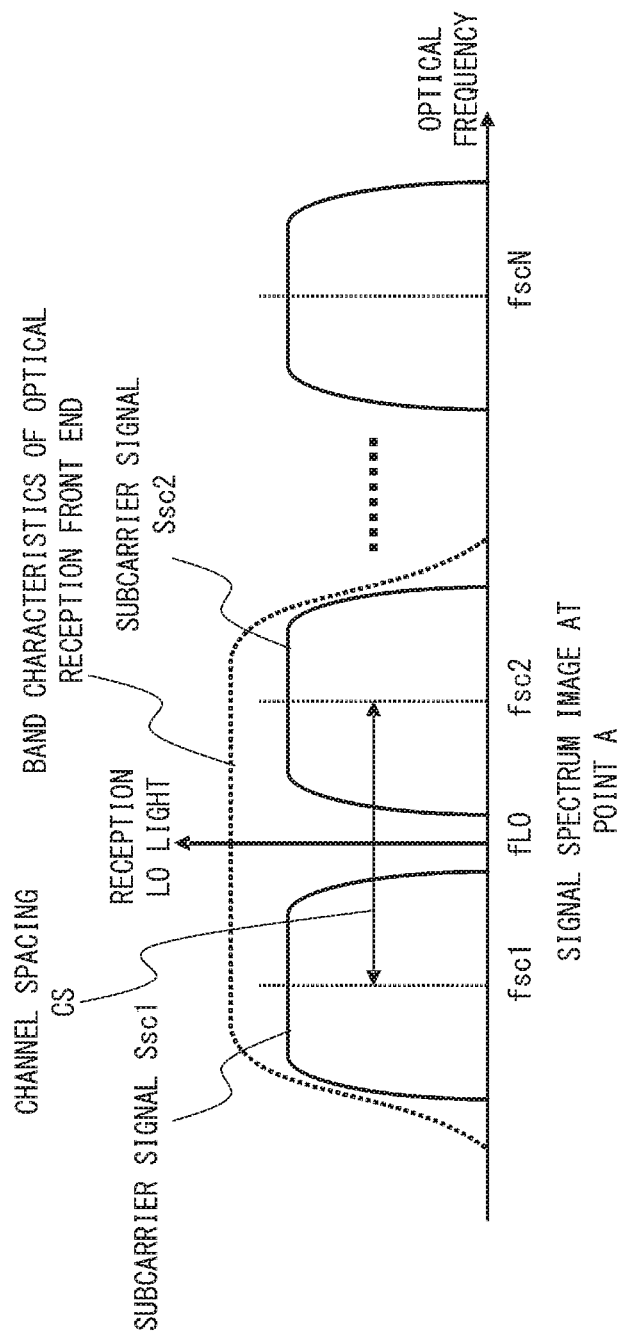
FIG. 3 shows a signal spectrum image at a point A of a receiving-side system shown in FIG. 2.

FIG. 3 shows a signal spectrum image at a point A of the receiving-side system 200 shown in FIG. 2. The point A is a point in front of the optical receiver 210-1. FIG. 3 shows a spectrum in which N subcarrier signals Ssc of the subcarrier signals Ssc1 to SscN are wavelength-multiplexed by the width of a channel spacing CS predetermined between transmission and reception. It is assumed here that the carrier frequencies of the subcarrier signals Ssc1 to SscN are fsc1 to fscN, respectively. Further, FIG. 3 shows a frequency fLO of the reception LO light by the reception LO light source 214 in the optical receiver 210-1. Further, in FIG. 3, the band characteristics (frequency characteristics; frequency band) of the optical reception front end 212 in the optical receiver 210-1 are overlapped using a dashed line. The reception LO light is located at the intermediate position between the subcarrier signals Ssc1 and Ssc2.

As shown in FIG. 3, for the optical receiver 210-1, two signals of the subcarrier signal Ssc1 and the subcarrier signal Ssc2, from among the N subcarrier signals Ssc1 to SscN, are included inside the band characteristics of the optical reception front end centered at the reception LO light. Accordingly, the optical reception front end 212 of the optical receiver 210-1 cuts out (extracts) the two subcarrier signals Ssc of the subcarrier signals Ssc1 and Ssc2 due to the effect of interference with the reception LO light. Then, the optical reception front end 212 converts the extracted subcarrier signals Ssc1 and Ssc2 to baseband signals, and outputs the converted signals to the frequency shift units 221 and 222. Note that in the other optical receivers 210-2 to 210-M, the other subcarrier signals Ssc3 to SscN are extracted in a way similar to that described above.

Figure 4:
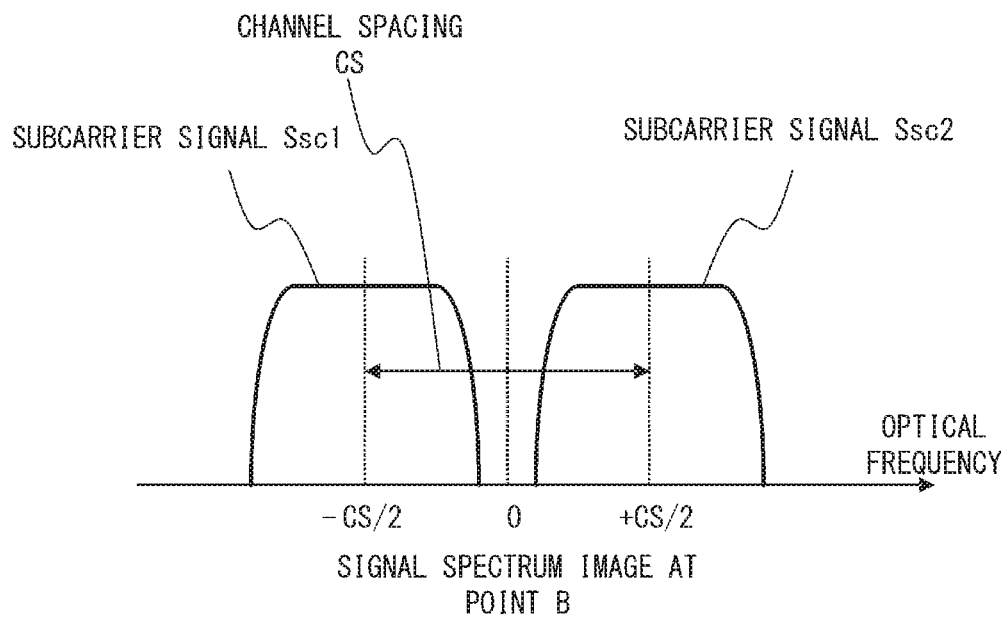
FIG. 4 shows a signal spectrum image at a point B of the receiving-side system shown in FIG. 2.

FIG. 4 shows a signal spectrum image at a point B of the receiving-side system 200 shown in FIG. 2. The point B is a point subsequent to the optical reception front end 212 and before it is branched to the frequency shift units 221 and 222. That is, FIG. 4 shows the signal spectrum image extracted by the optical reception front end 212. As shown in FIG. 3, the reception LO light is located at the intermediate position between the subcarrier signals Ssc1 and Ssc2. Accordingly, in the down-converted baseband signal at the point B, the subcarrier signal Ssc1 centered at a negative frequency of −CS/2 and the subcarrier signal Ssc2 centered at a positive frequency of +CS/2 are located symmetrically with respect to a frequency of 0. Then, the signal at the point B is branched in two directions, which are the frequency shift units 221 and 222.

Figure 5:
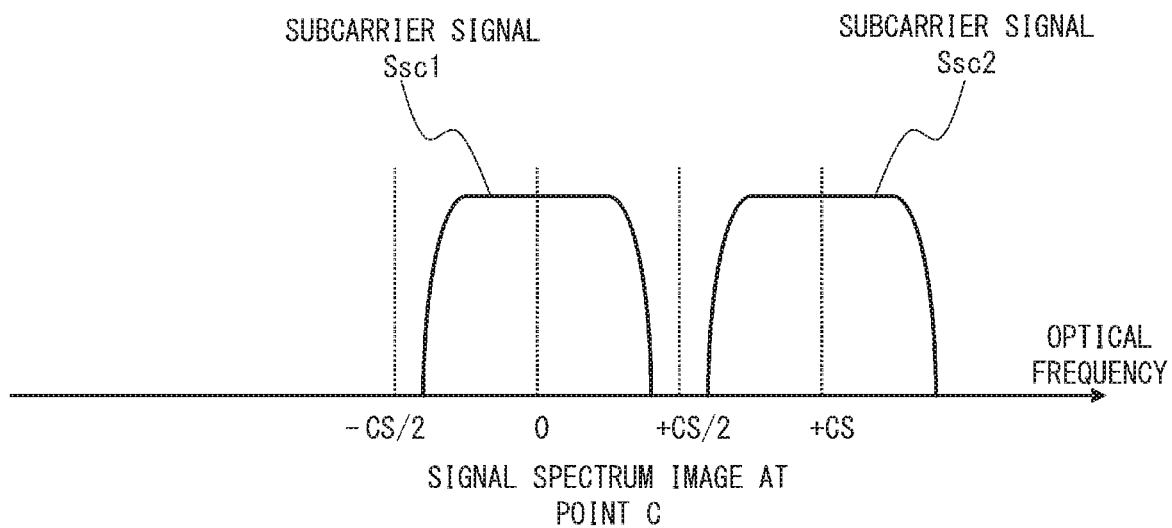
FIG. 5 shows a signal spectrum image at a point C of the receiving-side system shown in FIG. 2.

FIG. 5 shows a signal spectrum image at the point C of the receiving-side system 200 shown in FIG. 2. The point C is a point subsequent to the frequency shift unit 221. In order to cut out the subcarrier signal Ssc1 from the signal (the signal at the point B shown in FIG. 4) branched to the frequency shift unit 221, the frequency shift unit 221 applies a frequency shift of +CS/2 to that branched signal. As a result, in the signal spectrum, the subcarrier signal Ssc1 is located using a frequency of 0 as the center as shown in FIG. 5. That is, the frequency shift unit 221 applies a frequency shift corresponding to half of the channel spacing to the extracted signal in the positive direction.

Figure 6:
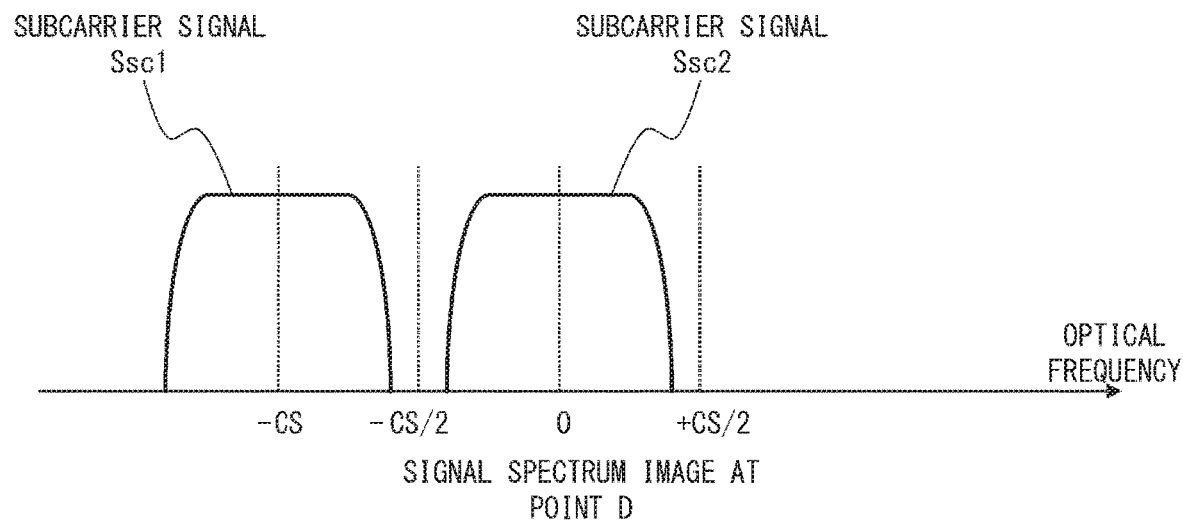
FIG. 6 shows a signal spectrum image at a point D of the receiving-side system shown in FIG. 2.

FIG. 6 shows a signal spectrum image at the point D of the receiving-side system 200 shown in FIG. 2. The point D is a point subsequent to the frequency shift unit 222. In order to cut out the subcarrier signal Ssc2 from the signal (the signal at the point B shown in FIG. 4) branched to the frequency shift unit 222, the frequency shift unit 222 applies a frequency shift of −CS/2 to that branched signal. As a result, in the signal spectrum, the subcarrier signal Ssc2 is located using a frequency of 0 as the center as shown in FIG. 6. That is, the frequency shift unit 221 applies a frequency shift corresponding to half of the channel spacing to the extracted signal in the negative direction.

Figure 7:
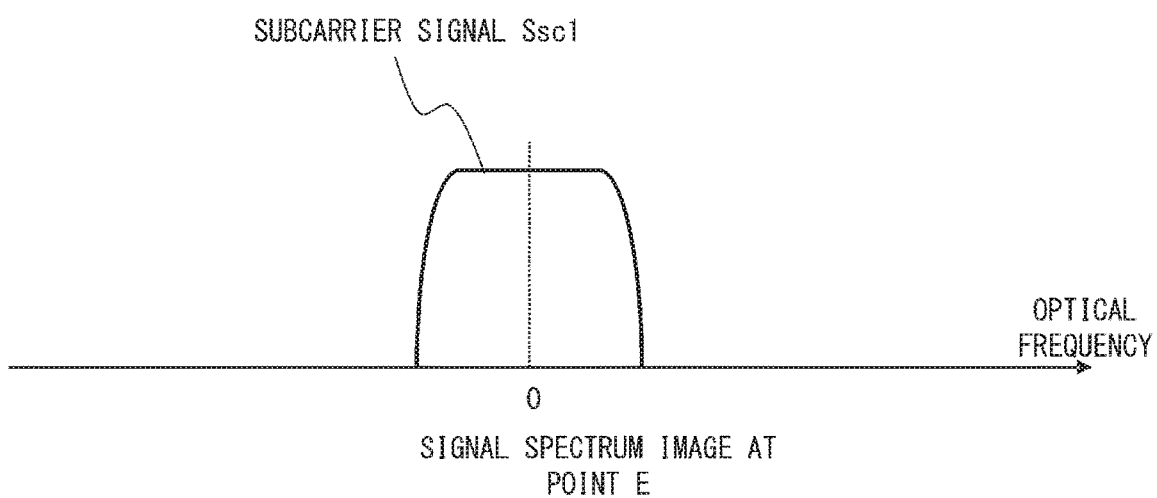
FIG. 7 shows a signal spectrum image at a point E of the receiving-side system shown in FIG. 2.

FIG. 7 shows a signal spectrum image at a point E of the receiving-side system 200 shown in FIG. 2. The point E is a point subsequent to the reception digital signal processing unit 231. The reception digital signal processing unit 231 removes the subcarrier signal Ssc2 from the signal at the point C (FIG. 5) to which the frequency shift has been applied using, for example, a high-frequency cutoff filter (high cut filter). In this way, the reception digital signal processing unit 231 extracts only the subcarrier signal Ssc1 and outputs it to the point E. Note that a high frequency cutoff filter can be replaced by a Nyquist filter or the like as long as a Nyquist transmission system is used.

Figure 8:
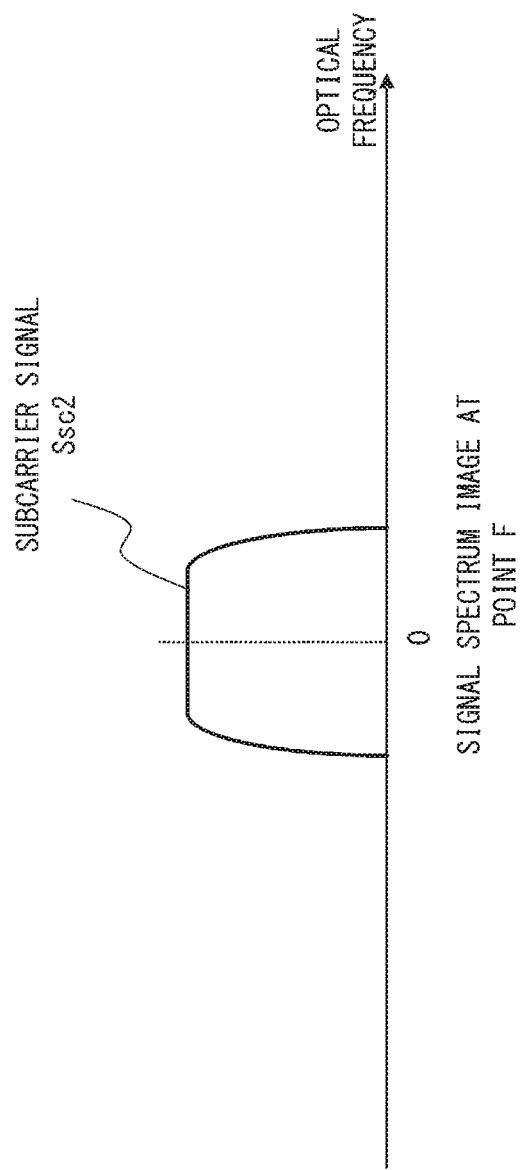
FIG. 8 shows a signal spectrum image at a point F of the receiving-side system shown in FIG. 2.

FIG. 8 shows a signal spectrum image at a point F of the receiving-side system 200 shown in FIG. 2. The point F is a point subsequent to the reception digital signal processing unit 232. The reception digital signal processing unit 232 removes the subcarrier signal Ssc1 from the signal at the point D (FIG. 6) to which the frequency shift has been applied using a high-frequency cutoff filter or the like. In this way, the reception digital signal processing unit 232 extracts only the subcarrier signal Ssc2 and outputs it to the point F. Note that as described above, a high-frequency cutoff filter can be replaced by a Nyquist filter or the like as long as a Nyquist transmission system is used.

If the signal spectrum is in the state shown in FIGS. 3 to 8, that is, if the optical frequencies (light source frequencies) of the light sources on the transmitting side and the receiving side (i.e., the transmission light source 116 and the reception LO light source 214) are appropriately arranged, it is not necessary to control the light source frequencies of the transmitting-side and the receiving-side. That is, a single optical reception front end 212 collectively extracts two subcarrier signals Ssc (the subcarrier signals Ssc1 and Ssc2 in the above-described example) from a plurality of wavelength-multiplexed subcarrier signals Ssc1 to SscN to perform signal processing. Accordingly, it is possible to efficiently separate two subcarrier signals from a plurality of wavelength-multiplexed subcarrier signals.

Figure 9:
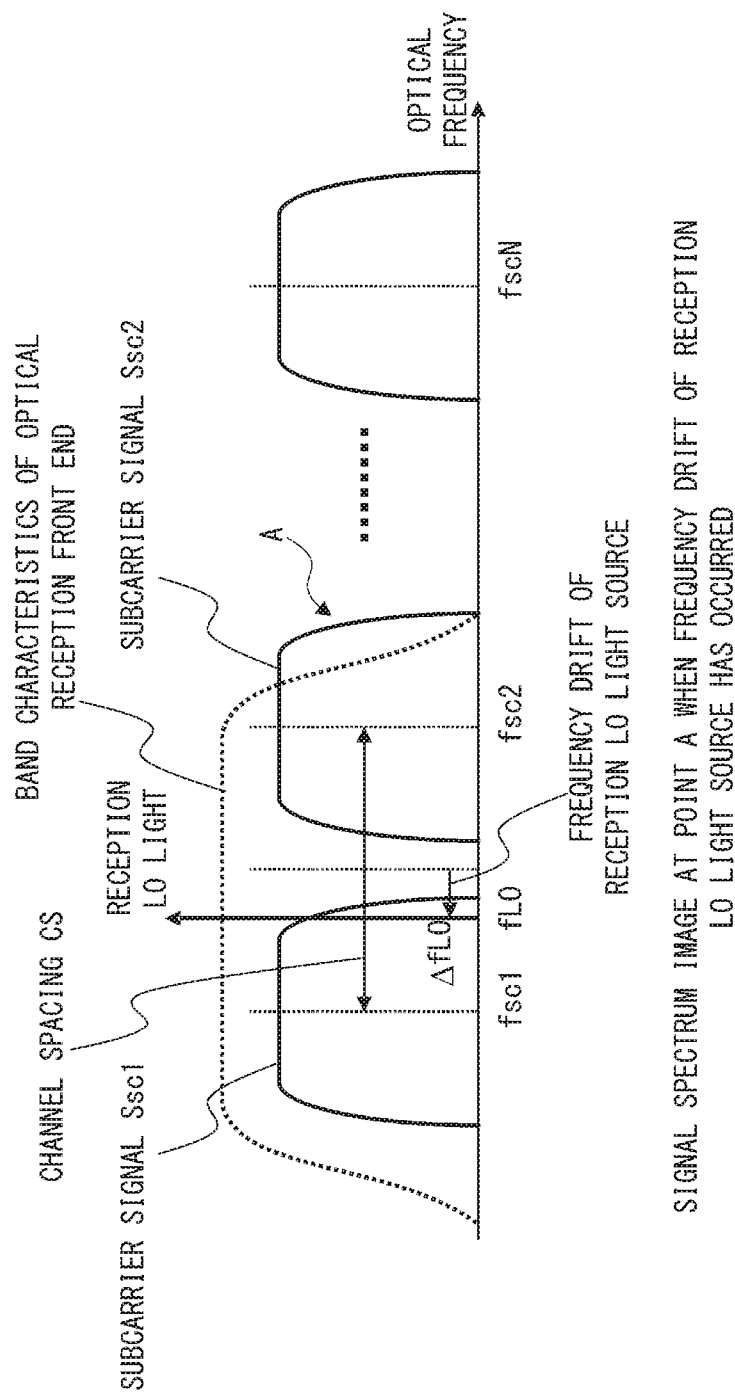
FIG. 9 shows a signal spectrum image of the point A (FIG. 2) when a light source frequency of a reception LO light source drifts.
Figure 10:
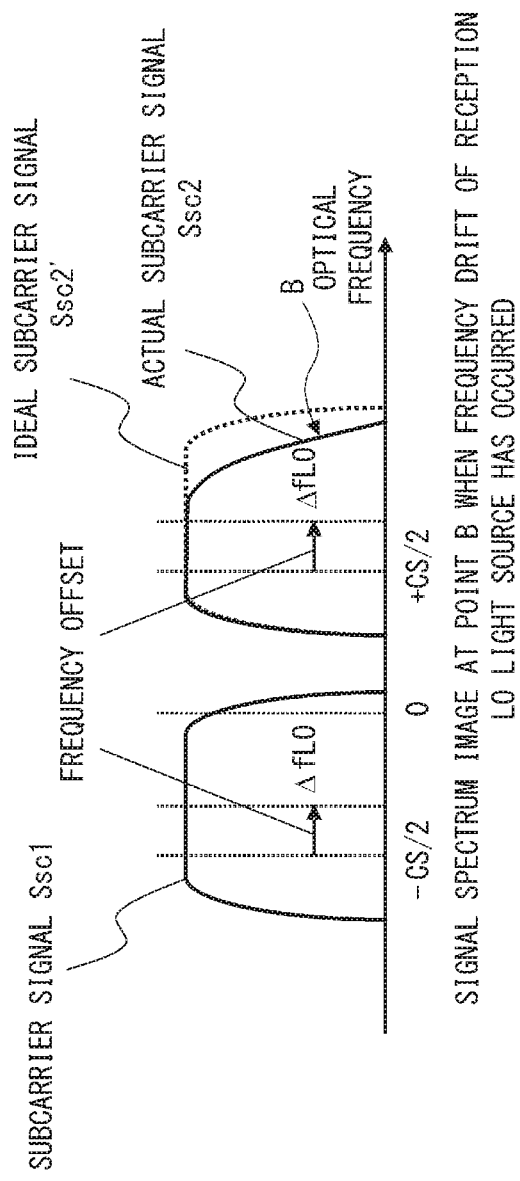
FIG. 10 shows a signal spectrum image of the point B (FIG. 2) when the light source frequency of the receiving LO light source drifts.
Figure 11:
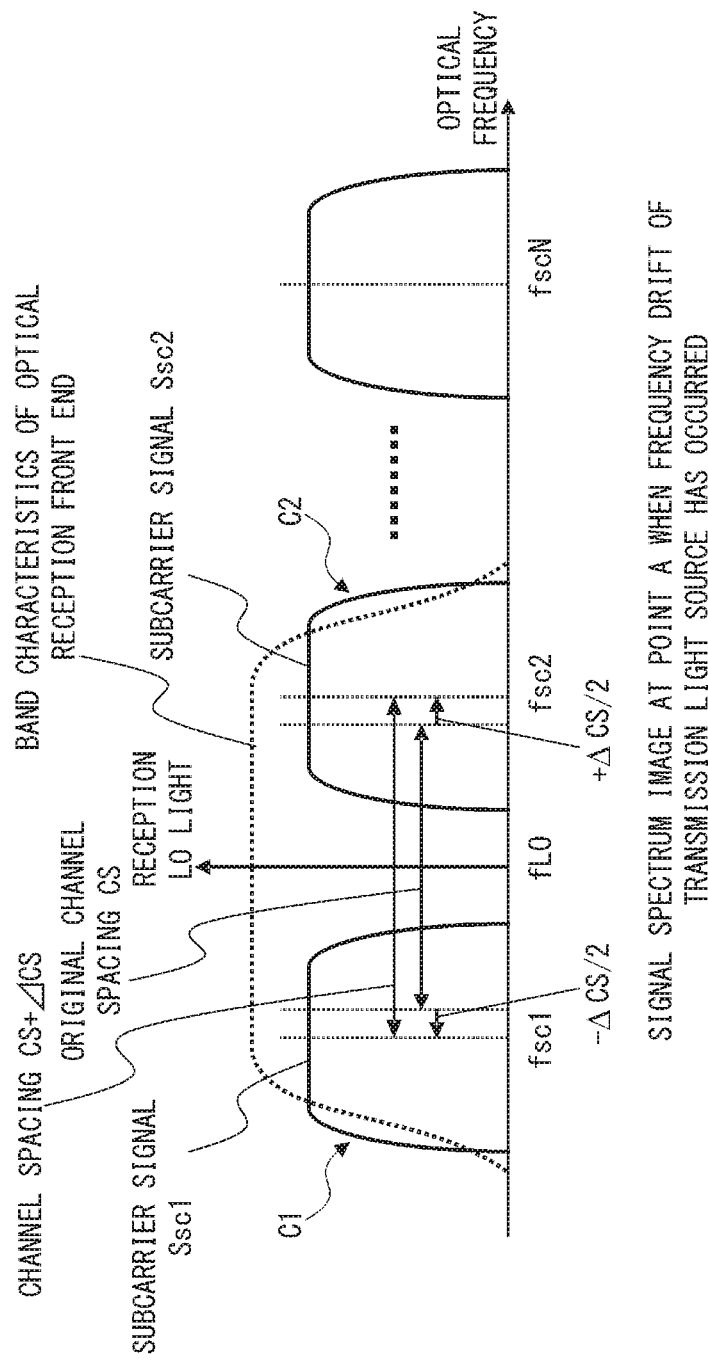
FIG. 11 shows a signal spectrum image of the point A (FIG. 2) when a light source frequency of a transmission light source drifts.
Figure 12:
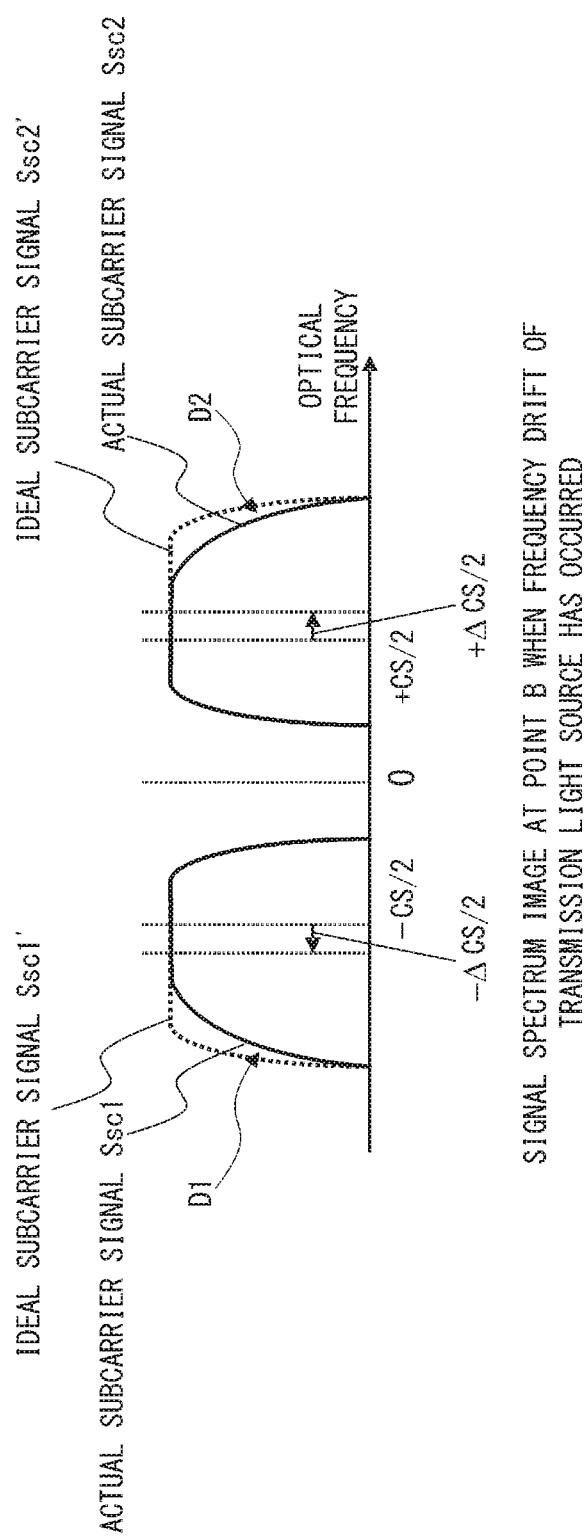
FIG. 12 shows a signal spectrum image of the point B (FIG. 2) when the light source frequency of the transmission light source drifts.

Next, the effect when the light source frequencies of the transmitting side and the receiving side drift (vary) is described. FIGS. 9 and 10 are diagrams for explaining the effect when the light source frequency of the reception LO light source 214 drifts. FIGS. 11 and 12 are diagrams for explaining the effect when the light source frequency of the transmission light source 116 drifts.

FIG. 9 shows a signal spectrum image of the point A (FIG. 2) when the light source frequency of the reception LO light source 214 drifts. As compared with the signal spectrum image shown in FIG. 3, the frequency fLO of the reception LO light is shifted to the left by ΔfLO (in the negative direction of the optical frequency) due to the frequency drift occurred in the reception LO light source 214. Consequently, the band characteristic of the optical reception front end 212 is also shifted to the left by ΔfLO. As a result, although the subcarrier signal Ssc1 is included in the frequency band of optical reception front end 212, a part of the spectrum of the subcarrier signal Ssc2 deviates outside the frequency band of the optical reception front end 212 as indicated by an arrow A.

FIG. 10 shows a signal spectrum image of the point B (FIG. 2) when the light source frequency of the receiving LO light source 214 drifts. In FIG. 10, the actual subcarrier signal Ssc2 is indicated by a solid line while the ideal subcarrier signal Ssc2' is indicated by a dashed line. Further, as compared with the signal spectrum shown in FIG. 4, in the subcarrier signal Ssc1 and the subcarrier signal Ssc2, it appears that a frequency offset of ΔfLO has occurred in the right direction as viewed relatively from the reception LO light (i.e., in the direction opposite to that of the frequency drift) due to the effect of the frequency drift of the light source frequency of the reception LO light source 214 in the left direction.

In the case of the state shown in FIG. 9, in the signal spectrum extracted by the optical reception front end 212 as shown in FIG. 10, the signal spectrum on the right side of the subcarrier signal Ssc2 deviated from the frequency band of the optical reception front end 212 is reduced compared to that of the ideal subcarrier signal Ssc2' as indicated by an arrow B. Accordingly, the information corresponding to a part where the signal spectrum is reduced is lost. Thus, the waveform is largely distorted and only the reception characteristic of the subcarrier signal Ssc2 is significantly degraded. Note that regarding the overall performance of the optical communications system 50, the effect of the characteristic of the subcarrier signal Ssc having the worst characteristic is dominant, and thus the overall performance of the optical communications system 50 is significantly degraded when only the reception characteristic of the subcarrier signal Ssc2 is significantly degraded.

FIG. 11 shows a signal spectrum image of the point A (FIG. 2) when a light source frequency of the transmission light source 116 drifts. FIG. 11 shows an example in which frequencies of the transmission light sources 116-1 and 116-2 forming the subcarrier signals Ssc1 and Ssc2, respectively, each drift to the left side and the right side.

It is assumed that the optical frequency fsc1 of the transmission light source 116-1 and the optical frequency fsc2 of the transmission light source 116-2 each vary from the state shown in FIG. 3 and drift in the direction in which the channel spacing CS is widened. In this case, as indicated by arrows C1 and C2 in FIG. 11, a part of the subcarrier signal Ssc1 and a part of the subcarrier signal Ssc2 may deviate outside the frequency band of the optical reception front end 212. Specifically, the left side of the subcarrier signal Ssc1 and the right side of the subcarrier signal Ssc2 deviate outside the frequency band of the optical reception front end 212. Note that when the frequencies of the transmission light sources 116-1 and 116-2 drift to the left side and the right side by ΔCS/2, respectively, the channel spacing is CS+ΔCS.

FIG. 12 shows a signal spectrum image of the point B (FIG. 2) when the light source frequency of the transmission light source 116 drifts. In FIG. 12, the actual subcarrier signals Ssc1 and Ssc2 are indicated by a solid line while the ideal subcarrier signals Ssc1' and Ssc2' are indicated by a dashed line.

In the case of the state shown in FIG. 11, as indicated by an arrow D1 in FIG. 12, the signal spectrum on the left side of the subcarrier signal Ssc1 deviated from the frequency band of the optical reception front end 212 is reduced compared to that of the ideal subcarrier signal Ssc1'. Similarly, as indicated by an arrow D2 in FIG. 12, the signal spectrum on the right side of the subcarrier signal Ssc2 deviated from the frequency band of the optical reception front end 212 is reduced compared to that of the ideal subcarrier signal Ssc2'. As a result, the information corresponding to a part where the signal spectrum is reduced is lost. Thus, as to both of the subcarrier signals Ssc1 and Ssc2, the waveforms are distorted and the characteristics are degraded.

As described above, when two sub-carrier signals Ssc are collectively received using the optical reception front end 212 of which the margin of the band characteristics is not large, the reception characteristics may be significantly degraded due to the influence of the frequency drifts of the light sources on the transmitting side and the receiving side. In order to solve the aforementioned problem, the optical communications system 50 according to this example embodiment is configured so that it controls the light source frequencies of the transmitting side and the receiving side by being provided with the light source frequency control system 300 including the frequency offset monitor unit 310.

Figure 13:
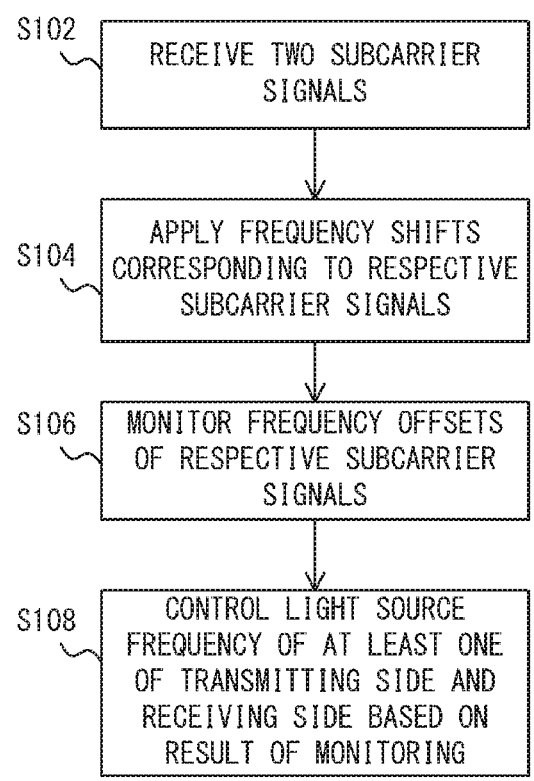
FIG. 13 is a flowchart showing an optical frequency control method performed in the optical communications system according to the first example embodiment.

FIG. 13 is a flowchart showing an optical frequency control method performed in the optical communications system 50 according to the first example embodiment. First, a single optical reception front end 212 receives two subcarrier signals Ssc (the subcarrier signals Ssc1 and Ssc2 at the optical reception front end 212 of the optical receiver 210) (Step S102). Specifically, as described above, the optical reception front end 212 extracts signals including the two subcarrier signals Ssc from among the subcarrier-multiplexed reception signals by the above-described method (FIGS. 4, 10 and 12). Further, the optical reception front end 212 transmits the extracted signals including the two subcarrier signals Ssc to the two frequency shift units 221 and 222.

The two frequency shift units 221 and 222 apply frequency shifts corresponding to the respective subcarrier signals Ssc to the signals including the two subcarrier signals Ssc received from the optical reception front end 212 (Step S104). Specifically, as described with reference to FIG. 5, the frequency shift unit 221 applies a frequency shift of +CS/2 to the signal including the two subcarrier signals Ssc. Similarly, as described with reference to FIG. 6, the frequency shift unit 222 applies a frequency shift of −CS/2 to the signal including the two subcarrier signals Ssc.

Next, the frequency offset monitor unit 310 monitors the frequency offsets of the respective subcarrier signals Ssc (Step S106). Specifically, as described above, the frequency offset monitor unit 310 extracts the outputs of the frequency shift units 221 and 222 from the points C and D in FIG. 2, that is, the subsequent stages of the frequency shift units 221 and 222. The frequency offset monitor unit 310 detects the frequency offset of each of the subcarrier signal Ssc1 and the subcarrier signal Ssc2. The frequency offset monitor unit 310 acquires information about the detected frequency offsets as a frequency offset monitor result which is the result of the monitoring.

Further, the frequency offset monitor unit 310 generates frequency offset sum information Osum which is information indicating the sum of the frequency offset of the subcarrier signal Ssc1 and the frequency offset of the subcarrier signal Ssc2. Further, the frequency offset monitor unit 310 generates frequency offset difference information Odif which is information indicating the difference between the frequency offset of the subcarrier signal Ssc1 and the frequency offset of the subcarrier signal Ssc2. Note that the frequency offset monitor result includes the frequency offset sum information Osum and the frequency offset difference information Odif. The frequency offset monitor unit 310 transmits (transfers) the frequency offset sum information Osum to the reception LO light source frequency control unit 322 of the light source frequency control unit 320. Further, the frequency offset monitor unit 310 transmits (transfers) the frequency offset difference information Odif to the transmission light source frequency control unit 324 of the light source frequency control unit 320.

Next, the light source frequency control unit 320 controls a frequency of at least one of the light source on the transmitting side and the light source on the receiving side based on the result of the monitoring performed by the frequency offset monitor unit 310 (Step S108). Specifically, the reception LO light source frequency control unit 322 of the light source frequency control unit 320 controls the optical frequency of the reception LO light source 214 using the frequency offset sum information Osum. Further, the transmission light source frequency control unit 324 of the light source frequency control unit 320 controls the optical frequency of the transmission light sources 116 (transmission light sources 116-1 and 116-2) using the frequency offset difference information Odif.

As shown in FIGS. 9 and 10, processing when a frequency drift occurs in the reception LO light is described. As described above, it is assumed that the optical frequency fLO of the reception LO light has been shifted by ΔfLO in the left direction as shown in FIG. 9. In this case, as shown in FIG. 10, it appears that the shift by the same ΔfLO in the opposite direction (the right direction) has occurred for the subcarrier signal Ssc1 (−CS/2) and the subcarrier signal Ssc2 (+CS/2).

It is assumed here that the frequency offset of the subcarrier signal Ssc1 is fos1 and the frequency offset of the subcarrier signal Ssc2 is fos2. The frequency offset monitor unit 310 acquires the frequency offset monitor result of fos1=fos2=+ΔfLO. Further, the frequency offset monitor unit 310 generates frequency offset sum information Osum indicating (fos1+fos2)/2=+ΔfLO. Then, the reception LO light source frequency control unit 322 performs feedback control of the frequency of the reception LO light source 214 so that (fos1+fos2)/2=+ΔfLO indicated by the frequency offset sum information Osum is zero. That is, the reception LO light source frequency control unit 322 controls the frequency of the reception LO light source 214 so that the frequency drift occurred in the reception LO light is consequently canceled.

By performing this light frequency control of the reception LO light, it is possible to locate the reception LO light at the midpoint between the subcarrier signal Ssc1 and the subcarrier signal Ssc2. Note that the aforementioned feedback control may be intermittently controlled, or constantly monitored and controlled, in accordance with the characteristics of the light frequency drift of the light source. When it is constantly controlled, the reception LO light can be constantly maintained at the midpoint between the subcarrier signal Ssc1 and the subcarrier signal Ssc2 even if the optical frequency of the reception LO light source drifts. That is, the band characteristic of the optical reception front end 212 is symmetrical centered at a frequency of 0, and it is thus possible to equally cut out the subcarrier signal Ssc1 and the subcarrier signal Ssc2 by performing the aforementioned optical frequency control of the reception LO light. In other words, it is possible to equally cut out the subcarrier signal Ssc1 and the subcarrier signal Ssc2 without the characteristics of one of the subcarrier signal Ssc1 and the subcarrier signal Ssc2 being degraded.

Next, as shown in FIGS. 11 and 12, processing when a frequency drift occurs in the transmission light sources 116-1 and 116-2 is described. As described above, it is assumed that the optical frequency fsc1 of the transmission light source 116-1 has been shifted by Δfsc1 in the left direction, that is, in the direction in which the channel spacing CS is widened, and that the optical frequency fsc2 of the transmission light source 116-2 has been shifted by Δfsc2 in the right direction, that is, in the direction in which the channel spacing CS is widened as shown in FIG. 11. In this case, when it is assumed that the right direction is positive, the channel spacing CS is consequently widened by ΔCS=Δfsc2−Δfsc1.

As shown in FIG. 12, after the frequency control has been appropriately performed by the reception LO light source 214, it appears that a frequency offset of ½ of ΔCS has been added to the subcarrier signal Ssc1 and the subcarrier signal Ssc2 in the directions opposite to each other due to the influence of ΔCS. That is, the frequency offset monitor unit 310 acquires the frequency offset monitor result in which the frequency offset of the subcarrier signal Ssc1 fos1=−ΔCS/2 and the frequency offset of the subcarrier signal Ssc2 fos2=+ ΔCS/2. Further, the frequency offset monitor unit 310 generates frequency offset difference information Odif indicating (fos1−fos2)/2=−ΔCS/2.

Accordingly, by using the frequency offset difference information Odif, the transmission light source frequency control unit 324 controls the transmission light source 116-1 so that it applies a frequency shift of −(fos1−fos2)/2=+ΔCS/2 to the signal. Meanwhile, the transmission light source frequency control unit 324 controls the transmission light source 116-2 so that it applies a frequency shift of +(fos1−fos2)/2=−ΔCS/2 to the signal. Thus, the frequency interval between the transmission light sources 116-1 and 116-2 can be maintained at a predetermined CS. That is, it is possible to appropriately set the channel spacing between the transmission subcarrier signals Ssc1 and Ssc2 which are the transmission sources.

Note that in the same manner as that of the optical frequency control of the reception LO light, the feedback control of the optical frequency of the transmission light source 116 may be intermittently controlled, or constantly monitored and controlled, in accordance with the characteristics of the frequency drift of the light source. When it is constantly controlled, the optical frequency intervals of the transmission light sources 116-1 and 116-2 can be constantly maintained at a predetermined CS. By doing so, the signal is prevented from deviating outside the frequency band of the optical reception front end 212 due to the frequency drift that has occurred in the transmission light source 116 as shown in FIG. 12. Accordingly, the optical reception front end 212 can appropriately extract the two subcarrier signals Ssc.

Note that only after feedback controls of both the reception LO light source frequency control and the transmission light source frequency control are performed, can the light source frequencies on the transmitting side and the receiving side be in an appropriate relation. Accordingly, it is desirable that the optical frequency controls of both the transmitting side and the receiving side be performed in order to take full advantage of the band characteristics of the optical reception front end 212. As a matter of course, only performing either one of the controls is effective.

Further, as shown in FIGS. 11 and 12, when the drift has occurred in the light source frequency of the transmission light source 116, the value of the sum indicated by the frequency offset sum information Osum can be substantially zero. Further, as shown in FIGS. 9 and 10, when the drift has occurred in the light source frequency of the reception LO light source 214, the value of the difference indicated by the frequency offset difference information Odif is substantially zero. Accordingly, there is no problem if the feedback controls of both the reception LO light source frequency control and the transmission light source frequency control are simultaneously performed as described above.

Comparative Example

Figure 14:
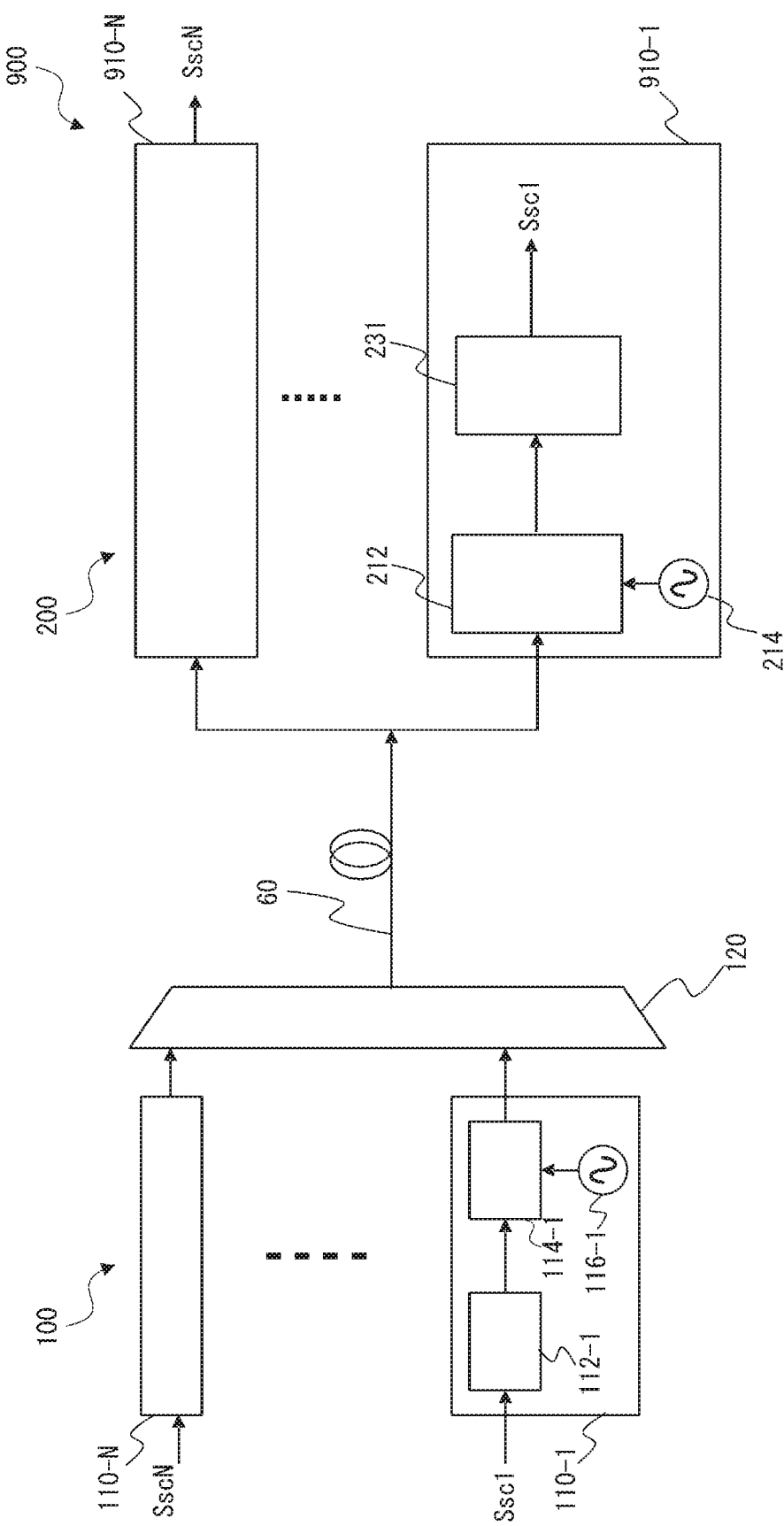
FIG. 14 is a diagram showing the optical communications system according to a comparative example.

FIG. 14 is a diagram showing an optical communications system 900 according to a comparative example. In the optical communications system 900 according to the comparative example, the configuration of the transmitting-side system 100 is substantially the same as that of the first example embodiment. The configuration of the receiving-side system 200 is different from that in the first example embodiment in that the receiving-side system 200 includes the same number of N optical receivers 910-1 to 910-N as that of the subcarrier signals Ssc.

In the configuration according to the comparative example, the more the number of subcarrier signals Ssc increases, the larger the circuit scale of the entire system proportionately becomes. Note that as Complementary metal-oxide-semiconductor (CMOS) miniaturization and the like progress, digital signal processing units, which can integrate the processes of a plurality of subcarrier signals Ssc on the same chip, may be integrated, reduced in size, and reduced in power in the future. However, an analog front end including an optical device requires a strict wide-band property, and it is thus difficult to be integrated and reduced in size.

In order to address the aforementioned problem, the number of optical reception front ends 212 can be reduced in the entire system if a plurality of subcarrier signals Ssc are received by one optical reception front end 212 (RxFE), and thus it may be possible to be integrated, reduced in size, and reduced in power. Radio communication in which band characteristics of the front end can be sufficiently achieved can implement such a method. However, in an optical communications system implementing a high capacity, a signal bandwidth to be handled is 100 times or more as wide as that of a radio, and requires a band of several tens of GHz or higher. Further, a frequency drift of the light sources on the transmitting side and the receiving side that determine the carrier frequency occurs, thereby causing a deviation of the subcarrier interval and frequency offsets of the subcarrier signals Ssc. As a result, it is difficult to appropriately cut out a plurality of subcarrier signals Ssc due to the band limitation of the optical reception front end 212, and thus the reception characteristic is degraded.

On the other hand, in this example embodiment, the receiving-side system 200 includes only a smaller number of the optical receivers 210 (the optical reception front ends 212) than that of the subcarrier signals Ssc. Therefore, as compared with the configuration according to the comparative example, the number of optical reception front ends can be reduced in the entire system, and it is thus possible to be integrated, reduced in size, and reduced in power. Further, the optical communications system 50 according to the first example embodiment, even when a frequency drift occurs in the light sources on the transmitting side and the receiving side, can appropriately extract the subcarrier signals Ssc in accordance with the band characteristics of the reception front end 212 by performing the optical frequency controls of the light sources on the transmitting side and the receiving side. Thus, it is possible to extract a plurality of subcarrier signals Ssc by making the most effective possible use of the band characteristics of the optical reception front end 212. That is, even when the band characteristics of the optical reception front end 212 cannot be sufficiently achieved, it is possible to appropriately extract a plurality of subcarrier signals. Accordingly, even if the number of optical reception front ends 212 is reduced below the number of subcarrier signals, it is possible to prevent the reception characteristics from being degraded.

Note that means for detecting the frequency offset is not limited to a particular method. However, the signals observed at the points C and D are signals on which digital processing and demodulation processing such as chromatic dispersion compensation and polarization processing have not yet been performed, and thus a frequency offset monitor which does not depend on chromatic dispersion, polarization, modulation system, etc. is preferably used. Further, when the frequency offset of the subcarrier signal Ssc1 (the point C) is monitored, the subcarrier signal Ssc2 may be removed using a high-frequency cutoff filter as necessary and then the frequency offset may be monitored. Similarly, when the frequency offset of the subcarrier signal Ssc2 (the point D) is monitored, the subcarrier signal Ssc1 may be removed using a high-frequency cutoff filter as necessary and then the frequency offset may be monitored. Furthermore, in FIG. 2, while the signal is branched from the points C and D to the frequency offset monitor unit 310, it may instead be branched from the points E and F.

Further, in the above-described example, the extraction of two subcarrier signals Ssc, which is the minimum configuration when a plurality of subcarrier signals Ssc are collectively received by a single optical reception front end 212, has been described. However, this example embodiment is not limited to such a configuration. The optical reception front end 212 may collectively receive three or more subcarrier signals Ssc. In this case, it is obvious that the concept of frequency control as described above can be broadened when three or more subcarrier signals are received.

Note that in order for the optical reception front end 212 to be able to receive two subcarrier signals Ssc, it is necessary for the optical reception front end 212 to have a minimum reception bandwidth for receiving the two subcarrier signals Ssc as the band characteristics thereof. However, as compared with the comparative example shown in FIG. 14, the number of optical reception front ends 212 can be reduced by half, thereby reducing the size and power of the entire system.

For example, as the bandwidth of the optical reception front end which is currently put into practical use or is about to be put into practical use, a wide-band characteristics of about 20 to 25 GHz in the case of a baud rate of 30 Gbaud band and about 30 to 35 GHz in the case of a higher-speed baud rate of 45 Gbaud band are obtained. Accordingly, the optical reception front end that uses the Nyquist transmission system or the like capable of narrowing a signal bandwidth has a small margin for the wide-band characteristics, however it can receive up to two subcarrier signals Ssc of 32 Gbaud having a signal bandwidth of substantially 16 GHz or more. Therefore, it is possible to implement the configuration shown in FIG. 2.

Second Example Embodiment

Next, a second example embodiment is described. The second example embodiment is different from the first example embodiment in that the channel spacing is narrowed as much as possible. Note that the control according to this second example embodiment is preferably performed after the subcarrier signal Ssc is adjusted to within the band characteristics of the optical reception front end 212 by the control according to the first example embodiment. By doing so, the two controls become independent of each other, whereby they can be easily performed.

Figure 15:
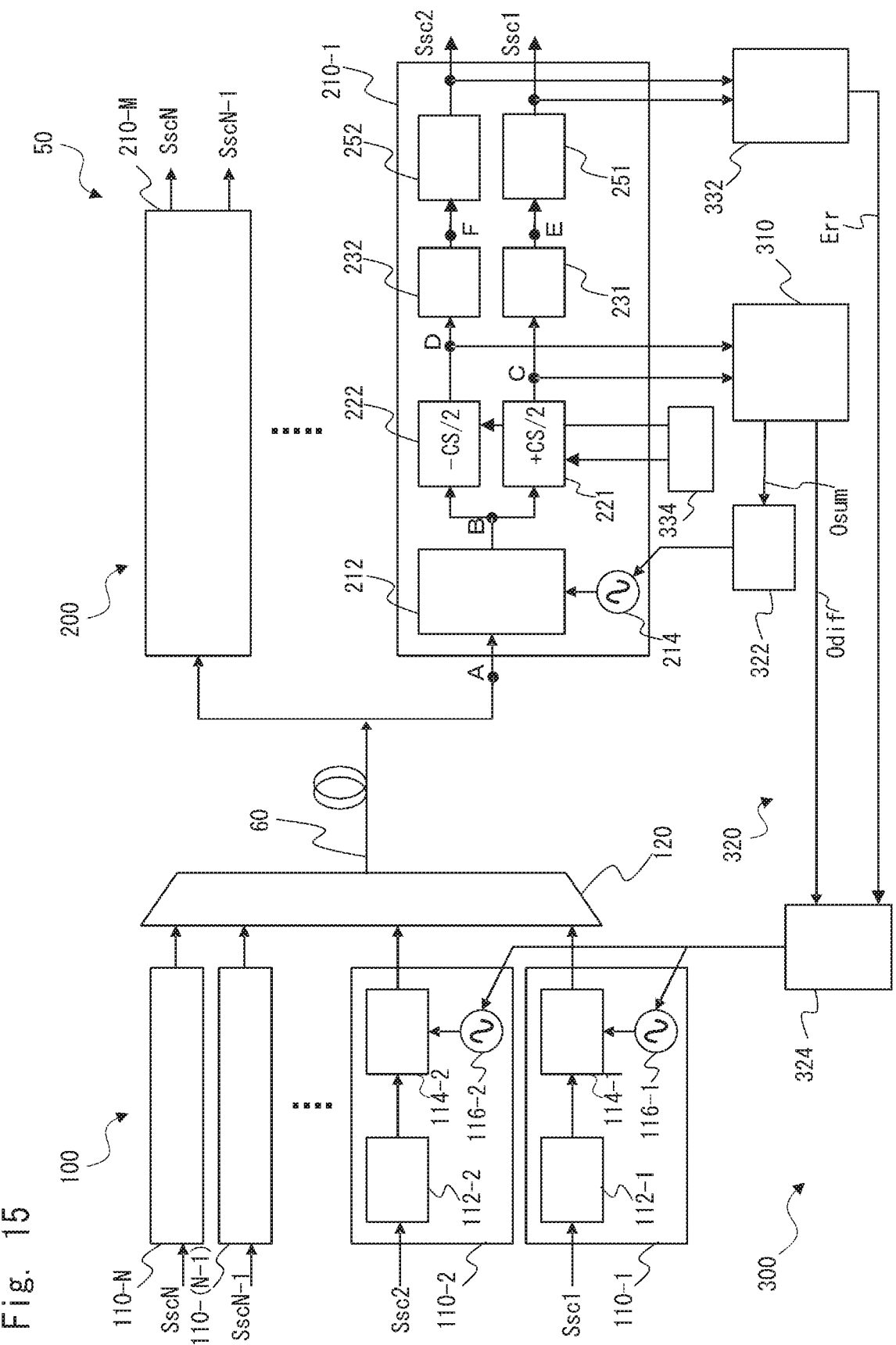
FIG. 15 is a diagram showing the optical communications system according to a second example embodiment.

FIG. 15 is a diagram showing the optical communications system 50 according to the second example embodiment. The optical communications system 50 includes the transmitting-side system 100, the receiving-side system 200, and the light source frequency control system 300. The configuration of the transmitting-side system 100 is substantially the same as that of the first example embodiment. The receiving-side system 200 includes M optical receivers 210-1 to 210-M. As shown in FIG. 15, the optical receiver 210 according to the second example embodiment includes the same components as those of the optical receivers 210 according to the first example embodiment.

Further, the optical receiver 210 according to the second example embodiment includes a demodulation unit 251 and a demodulation unit 252 at the subsequent stages of the reception digital signal processing unit 231 and the reception digital signal processing unit 232, respectively. The demodulation unit 251 performs demodulation processing on the subcarrier signal Ssc1. The demodulation unit 252 performs demodulation processing on the subcarrier signal Ssc2.

The light source frequency control system 300 according to the second example embodiment includes a bit error monitor 332 (bit error monitoring means) and a reception frequency shift control unit 334 in addition to the frequency offset monitor unit 310, the reception LO light source frequency control unit 322, and the transmission light source frequency control unit 324. The bit error monitor 332 monitors and detects error information Err which is information indicating a bit error rate obtained when error correction processing is performed in demodulation processing. The bit error monitor 332 transmits the error information Err to the transmission light source frequency control unit 324.

The transmission light source frequency control unit 324 controls the optical frequencies of the transmission light source 116-1 and the transmission light source 116-2 based on the error information Err to narrow the channel spacing as much as possible. The reception frequency shift control unit 334 appropriately controls the amounts of the frequency shifts of the frequency shift units 221 and 222 on the receiving side based on the channel spacing controlled by the transmission light source frequency control unit 324. The details will be described later.

Figure 16:
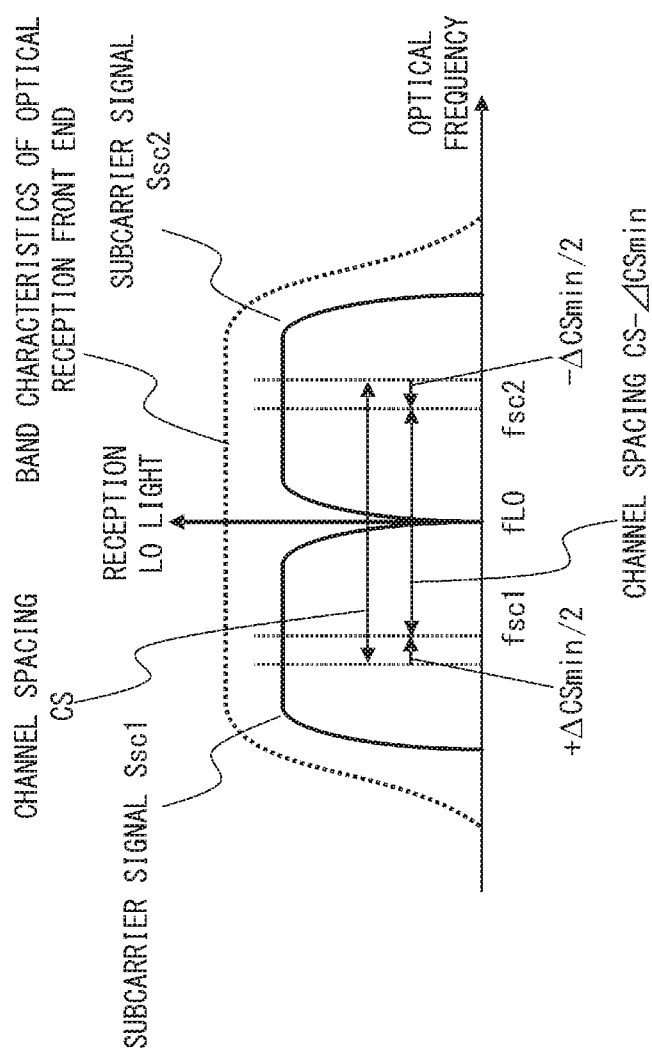
FIG. 16 shows a signal spectrum image according to the second example embodiment.

FIG. 16 shows a signal spectrum image according to the second example embodiment. In the second example embodiment, when the wavelength multiplexing interval between the subcarriers has a margin, that is, when there is a space between the adjacent subcarrier signals Ssc, the optical frequencies of the transmission light sources 116-1 and 116-2 are controlled in a direction in which the channel frequency is narrowed by gradually changing them within a range where the reception characteristics are not degraded, using the error information Err obtained by the bit error monitor 332.

Specifically, as shown in FIG. 3, when the subcarrier signals Ssc1 and Ssc2 do not overlap each other, the bit error rate hardly varies. However, when the subcarrier signals Ssc1 and Ssc2 overlap each other as a result of narrowing the channel spacing, the bit error rate significantly deteriorates from the predetermined value compared to the case where the subcarrier signals Ssc1 and Ssc2 do not overlap each other. Accordingly, when the bit error rate indicated by the error information Err does not deteriorate, the transmission light source frequency control unit 324 gradually changes the optical frequencies of the transmission light sources 116-1 and 116-2 in the direction in which the channel spacing is narrowed. On the other hand, when the bit error rate indicated by the error information Err has deteriorated, the transmission light source frequency control unit 324 changes the optical frequencies of the transmission light sources 116-1 and 116-2 in the direction in which the channel spacing is widened.

Then, as shown in FIG. 16, the channel spacing can be narrowed until the signal spectrum of the subcarrier signal Ssc1 and the signal spectrum of the subcarrier signal Ssc2 come into contact with each other. That is, the channel spacing is optimized to the highest-density wavelength multiplexing interval without a gap between the two subcarriers being caused. At this time, if it is assumed that the original channel spacing is CS, the channel spacing between the subcarrier signals Ssc1 and Ssc2 is narrowed to CS−ΔCSmin. In this case, the frequency of the transmission light source 116-1 is shifted (varies) by +ΔCSmim/2 from the original frequency. Further, the frequency of the transmission light source 116-2 is shifted (varies) by −ΔCSmim/2 from the original frequency.

The reception frequency shift control unit 334 adjusts the amount of the frequency shifts in the frequency shift units 221 and 222 in accordance with the changed channel spacing (that is, in accordance with the amount of change in the channel spacing). For example, in the example shown in FIG. 16, the channel spacing is CS−ΔCSmin and accordingly the reception frequency shift control unit 334 controls the frequency shift unit 221 so that it applies a frequency shift of +(CS−ΔCSmin)/2 to the signal. Further, the reception frequency shift control unit 334 controls the frequency shift unit 222 so that it applies a frequency shift of −(CS−ΔCSmin)/2 to the signal.

Note that various methods in which the reception frequency shift control unit 334 (i.e., the amount of change in channel spacing) detects the changed channel spacing have been developed. For example, the reception frequency shift control unit 334 may detect the changed channel spacing by acquiring the value of the optical frequency that the transmission light source frequency control unit 324 has instructed to the transmission light sources 116-1 and 116-2. By doing so, the reception frequency shift control unit 334 can control the amount of the frequency shift in real time. However, it is necessary to acquire information from the transmitting side, and thus wiring and the like may be complicated.

Further, the reception frequency shift control unit 334 may detect the changed channel spacing by using the frequency offset difference information Odif. Specifically, the optical transmitter 110 transmits the subcarrier signals Ssc1 and Ssc2 in a state where the channel spacing is controlled to become narrow by the transmission light source frequency control unit 324, and consequently the optical receiver 210 receives the subcarrier signals Ssc1 and Ssc2 in a state where the channel spacing is narrowed. Thus, contrary to the example of FIGS. 11 to 12, the channel spacing is narrowed. The channel spacing has varied, and it is thus possible for the frequency offset monitor unit 310 to generate frequency offset difference information Odif using the variation. Note that the positive and negative signs of the values indicated by the frequency offset difference information Odif can be opposite to those in the first example embodiment. Accordingly, the reception frequency shift control unit 334 can detect the changed channel spacing by using the frequency offset difference information Odif. In this way, signals can be transmitted and received by only the receiving side, thereby enabling wiring and the like to be easy to do as compared to the method using a control value of the transmission light source frequency control unit 324. However, the variation of the channel spacing in the subcarrier signal transmitted by the optical transmitter 110 in a state where the channel spacing is narrowed is detected, and thus real time properties are inferior to those in the method using a control value of the transmission light source frequency control unit 324.

In the second example embodiment, in addition to the improvement of the frequency usage efficiency according to the first example embodiment, it is possible to control the optical frequency in the direction in which a margin for the band characteristics of the optical reception front end 212 increases. Further, it is possible to use the aforementioned margin to ease the requirements for the band characteristics of the optical reception front end 212. Note that a light source frequency is controlled based on a bit error rate in the description of this example embodiment. However, this example embodiment is not limited to such a configuration. For example, a Q value correlated to a bit error rate, or Error Vector Magnitude (EVM) may be used.

Third Example Embodiment

Next, a third example embodiment is described. The third example embodiment is different from the first example embodiment in that the channel spacing is narrowed as much as possible. Further, the third example embodiment is different from the second example embodiment in that the channel spacing is narrowed using a spectrum monitor. Note that the control according to this third example embodiment is preferably performed after the subcarrier signal Ssc is adjusted to within the band characteristics of the optical reception front end 212 by the control according to the first example embodiment. By doing so, the two controls become independent of each other, whereby they are easily performed.

Figure 17:
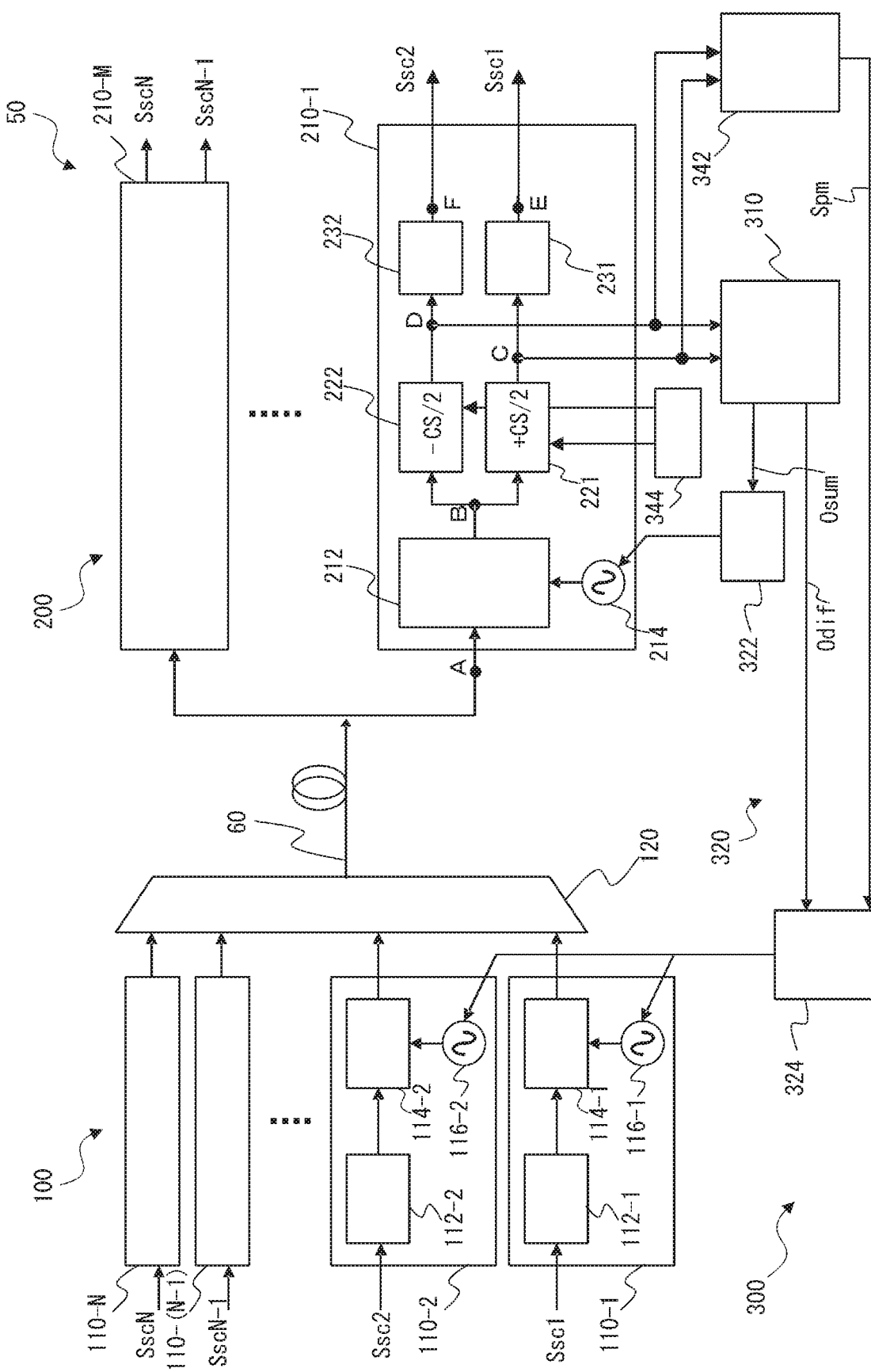
FIG. 17 is a diagram showing the optical communications system according to a third example embodiment.

FIG. 17 is a diagram showing the optical communications system 50 according to a third example embodiment. The optical communications system 50 includes the transmitting-side system 100, the receiving-side system 200, and the light source frequency control system 300. The configuration of transmitting-side system 100 is substantially the same as that of the first example embodiment. The receiving-side system 200 includes M optical receivers 210-1 to 210-M. As shown in FIG. 15, the optical receiver 210 according to the third example embodiment includes the same components as those of the optical receiver 210 according to the first example embodiment.

The light source frequency control system 300 according to the third example embodiment includes a spectrum monitor 342 (spectrum monitoring means) and a reception frequency shift control unit 344 in addition to the frequency offset monitor unit 310, the reception LO light source frequency control unit 322, and the transmission light source frequency control unit 324. Note that the configuration and the operation of the reception frequency shift control unit 344 are substantially the same as those of the reception frequency shift control unit 334 according to the second example embodiment, and thus the description thereof is omitted.

The spectrum monitor 342 extracts the signals at the point C and the point D. Both of (or one of) the signals at the points C and D are signals including the two subcarrier signal Ssc components of the subcarrier signal Ssc1 and the subcarrier signal Ssc2. Accordingly, the spectrum monitor 342 estimates the channel spacing of the two subcarrier signals Ssc from the shape (envelope) of the signal spectrum. The spectrum monitor 342 transmits spectrum monitor information Spm (result of monitoring) including information of the estimated channel spacing to the transmission light source frequency control unit 324.

The transmission light source frequency control unit 324 controls the optical frequencies of the transmission light sources 116-1 and 116-2 based on the spectrum monitor information Spm to narrow the channel spacing as much as possible. Specifically, the transmission light source frequency control unit 324 controls the frequency of the transmission light source 116 so that the channel spacing becomes the smallest one in which the spectrums of both subcarrier signals Ssc do not cause crosstalk (do not overlap each other). In this way, by performing control for narrowing the channel spacing as much as possible, the spectral image as shown in FIG. 16 can be implemented as is also the case in the second example embodiment. As described above, according to this example embodiment, the effect similar to that achieved in the second example embodiment can be achieved by controlling the channel spacing based on the spectrum monitor information Spm.

Comparative Example

Note that the present invention is not limited to the aforementioned example embodiments and may be changed as appropriate without departing from the spirit of the present disclosure. For example, the light source frequency control system 300 may not be physically separate from the receiving-side system 200. In other words, the light source frequency control system 300 may be provided inside the apparatus constituting the receiving-side system 200.

Further, in the above-described example embodiments, the frequency shift unit is configured to apply the frequency shifts corresponding to the respective subcarrier signals received by the optical reception front end to the subcarrier signals, and the frequency offset monitor unit 310 is configured to monitor the frequency offsets of the respective subcarrier signals to which the frequency shifts have been applied. However, the present invention is not limited to such a configuration. The frequency shift unit is not indispensable. That is, if the frequency offsets can be appropriately monitored, the frequency offset monitor unit 310 does not need to monitor the frequency offsets of the respective subcarrier signals to which the frequency shifts have been applied. However, by monitoring the frequency offsets of the respective subcarrier signals to which the frequency shifts have been applied, it is possible to monitor the frequency offsets more appropriately.

Further, in the above-described second and third example embodiments, the control is performed based on a bit error rate or spectrum monitor information. However, the present invention is not limited to such a configuration. For example, monitor information related to the reception characteristics may be used to control the channel spacing.

Further, although the present invention is described as a hardware configuration in the above-described example embodiments, the present invention is not limited thereto. In the present invention, processing of each circuit in the radio communication apparatus can be implemented by causing a Central Processing Unit (CPU) to execute a computer program.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

For example, the whole or part of the example embodiments disclosed above can be described as, but not limited to, the following supplementary notes.

Supplementary Note 1

An optical communications system comprising:
a transmitting-side system configured to wavelength-multiplex a plurality of subcarrier signals and transmit the wavelength-multiplexed subcarrier signals;
a receiving-side system configured to receive the plurality of wavelength-multiplexed subcarrier signals;
a light source frequency control system configured to control at least one of a light source frequency of the transmitting-side system and a light source frequency of the receiving-side system, wherein
the receiving-side system comprises an optical reception front end, the number of the optical reception front end being smaller than the number of the wavelength-multiplexed subcarrier signals, each of the optical reception front end being configured to receive two or more subcarrier signals of the plurality of subcarrier signals, and
the light source frequency control system comprises:
frequency offset monitoring means for monitoring frequency offsets of the respective subcarrier signals received by the optical reception front end; and
light source frequency control means for controlling at least one of a light source frequency of the transmitting-side system and a light source frequency of the receiving-side system based on a result of the monitoring performed by the frequency offset monitoring means.

Supplementary Note 2

The optical communications system described in Supplementary note 1, wherein
the frequency offset monitoring means generates frequency offset sum information indicating a sum of frequency offsets of the respective subcarrier signals and frequency offset difference information indicating a difference of the frequency offsets of the respective subcarrier signals, and
the light source frequency control means controls at least one of the light source frequency of the transmitting-side system and the light source frequency of the receiving-side system based on the frequency offset sum information and the frequency offset difference information.

Supplementary Note 3

The optical communications system described in Supplementary note 2, wherein the light source frequency control means controls the light source frequency of the receiving-side system so that the frequency offset indicated by the frequency offset sum information is canceled.

Supplementary Note 4

The optical communications system described in Supplementary note 2 or 3, wherein
regarding a first subcarrier signal of the respective subcarrier signals received by the optical reception front end, the light source frequency control means controls the light source frequency of the transmitting-side system so that it is shifted in a direction opposite to the frequency offset indicated by the frequency offset difference information, and regarding a second subcarrier signal of the respective subcarrier signals received by the optical reception front end that is different from the first subcarrier signal, the light source frequency control means controls the light source frequency of the transmitting-side system so that it is shifted in the same direction as the frequency offset indicated by the frequency offset difference information.

Supplementary Note 5

The optical communications system described in any one of Supplementary notes 1 to 4, further comprising frequency shift means for applying, based on a channel spacing of the plurality of subcarrier signals wavelength-multiplexed in the transmitting-side system, frequency shifts corresponding to the respective subcarrier signals received by the optical reception front end to the subcarrier signals, wherein the frequency offset monitoring means monitors the frequency offsets of the respective subcarrier signals to which the frequency shifts have been applied.

Supplementary Note 6

The optical communications system described in any one of Supplementary notes 1 to 5, wherein the light source frequency control system further comprises bit error monitoring means for monitoring a bit error rate obtained during demodulation of the respective subcarrier signals in the receiving-side system, and the light source frequency control means controls the light source frequency of the transmitting-side system based on a result of the monitoring performed by the bit error monitoring means so that the channel spacing of the respective subcarrier signals becomes narrow in the transmitting-side system.

Supplementary Note 7

The optical communications system described in Supplementary note 6, wherein when the bit error rate does not deteriorate from a predetermined value, the light source frequency control means controls the light source frequency of the transmitting-side system so that the channel spacing becomes narrow, and when the bit error rate has deteriorated to a predetermined value or higher, the light source frequency control means controls the light source frequency of the transmitting-side system so that the channel spacing becomes wide.

Supplementary Note 8

The optical communications system described in any one of Supplementary notes 1 to 5, wherein the light source frequency control system further comprises spectrum monitoring means for estimating the channel spacing of the respective subcarrier signals received by the optical reception front end from signal spectrums of the respective subcarrier signals in the receiving-side system, and the light source frequency control means controls the light source frequency of the transmitting-side system based on the estimated channel spacing so that the channel spacing of the respective subcarrier signals becomes narrow in the transmitting-side system.

Supplementary Note 9

An optical frequency control method comprising:

receiving, in a receiving-side system, a plurality of subcarrier signals wavelength-multiplexed and transmitted by a transmitting-side system by using an optical reception front end, the number of the optical reception front end being smaller than the number of the wavelength-multiplexed subcarrier signals;

causing each of the optical reception front end to receive two or more subcarrier signals of the plurality of subcarrier signals;

monitoring frequency offsets of the respective subcarrier signals received by the optical reception front end; and controlling at least one of a light source frequency of the transmitting-side system and a light source frequency of the receiving-side system based on a result of the monitoring of the frequency offsets.

Supplementary Note 10

The optical frequency control method described in Supplementary note 9, wherein frequency offset sum information indicating a sum of frequency offsets of the respective subcarrier signals and frequency offset difference information indicating a difference of the frequency offsets of the respective subcarrier signals are generated, and at least one of the light source frequency of the transmitting-side system and the light source frequency of the receiving-side system is controlled based on the frequency offset sum information and the frequency offset difference information.

Supplementary Note 11

The optical frequency control method described in Supplementary note 10, wherein the light source frequency of the receiving-side system is controlled so that the frequency offset indicated by the frequency offset sum information is canceled.

Supplementary Note 12

The optical frequency control method described in Supplementary note 10 or 11, wherein regarding a first subcarrier signal of the subcarrier signals received by the optical reception front end, the light source frequency of the transmitting-side system is controlled so that it is shifted in a direction opposite to the frequency offset indicated by the frequency offset difference information, and regarding a second subcarrier signal of the subcarrier signals received by the optical reception front end which is different from the first subcarrier signal, the light source frequency of the transmitting-side system is controlled so that it is shifted in the same direction as the frequency offset indicated by the frequency offset difference information.

Supplementary Note 13

The optical frequency control method described in any one of Supplementary notes 9 to 12, wherein frequency shifts corresponding to the respective subcarrier signals received by the optical reception front end are applied, based on a channel spacing of the plurality of subcarrier signals wavelength-multiplexed in the transmitting-side system, to the subcarrier signals, and the frequency offsets of the respective subcarrier signals to which the frequency shifts have been applied are monitored.

Supplementary Note 14

The optical frequency control method described in any one of Supplementary notes 9 to 13, wherein a bit error rate obtained during demodulation of the respective subcarrier signals in the receiving-side system is monitored, and a light source frequency of the transmitting-side system is controlled based on a result of the monitoring of the bit error rate so that the channel spacing of the respective subcarrier signals becomes narrow in the transmitting-side system.

Supplementary Note 15

The optical frequency control method described in Supplementary note 14, wherein when the bit error rate does not deteriorate from a predetermined value, the light source frequency of the transmitting-side system is controlled so that the channel spacing becomes narrow, and when the bit error rate has deteriorated to a predetermined value or higher, the light source frequency of the transmitting-side system is controlled so that the channel spacing becomes wide.

Supplementary Note 16

The optical frequency control method described in any one of Supplementary notes 9 to 13, wherein the channel spacing of the respective subcarrier signals received by the optical reception front end is estimated from signal spectrums of the respective subcarrier signals in the receiving-side system, and the light source frequency of the transmitting-side system is controlled based on the estimated channel spacing so that the channel spacing of the respective subcarrier signals becomes narrow in the transmitting-side system.

While the present invention has been described with reference to the example embodiments, the present invention is not limited to the aforementioned example embodiments. Various changes that can be understood by those skilled in the art can be made to the configurations and the details of the present invention within the scope of the present invention.

This application is based upon and claims the benefit of priority from Japanese Patent Application No. 2017-041280, filed on Mar. 6, 2017, the disclosure of which is incorporated herein in its entirety by reference.

REFERENCE SIGNS LIST

1 OPTICAL COMMUNICATIONS SYSTEM
2 TRANSMITTING-SIDE SYSTEM
10 RECEIVING-SIDE SYSTEM
12 OPTICAL RECEPTION FRONT END
14 FREQUENCY SHIFT UNIT
20 LIGHT SOURCE FREQUENCY CONTROL SYSTEM
22 FREQUENCY OFFSET MONITORING UNIT
24 LIGHT SOURCE FREQUENCY CONTROL UNIT
50 OPTICAL COMMUNICATIONS SYSTEM
60 OPTICAL TRANSMISSION LINE
100 TRANSMITTING-SIDE SYSTEM
110 OPTICAL TRANSMITTER
112 TRANSMISSION DIGITAL PROCESSING UNIT
114 OPTICAL TRANSMISSION FRONT END
116 TRANSMISSION LIGHT SOURCE
120 MULTIPLEXER
200 RECEIVING-SIDE SYSTEM
210 OPTICAL RECEIVER
212 OPTICAL RECEPTION FRONT END
214 RECEPTION LO LIGHT SOURCE
221, 222 FREQUENCY SHIFT UNIT
231, 232 RECEPTION DIGITAL SIGNAL PROCESSING UNIT
251, 252 DEMODULATION UNIT
300 LIGHT SOURCE FREQUENCY CONTROL SYSTEM
310 FREQUENCY OFFSET MONITOR UNIT
320 LIGHT SOURCE FREQUENCY CONTROL UNIT
322 RECEPTION LO LIGHT SOURCE FREQUENCY CONTROL UNIT
324 TRANSMISSION LIGHT SOURCE FREQUENCY CONTROL UNIT
332 BIT ERROR MONITOR
334 RECEPTION FREQUENCY SHIFT CONTROL UNIT
342 SPECTRUM MONITOR
344 RECEPTION FREQUENCY SHIFT CONTROL UNIT

The invention claimed is:

1. An optical communications system comprising:
a transmitting-side system configured to wavelength-multiplex a plurality of subcarrier signals and transmit the wavelength-multiplexed subcarrier signals;
a receiving-side system configured to receive the plurality of wavelength-multiplexed subcarrier signals;
a light source frequency control system configured to control at least one of a light source frequency of the transmitting-side system and a light source frequency of the receiving-side system, wherein
the receiving-side system comprises an optical reception front end, the number of the optical reception front end being smaller than the number of the wavelength-multiplexed subcarrier signals, each of the optical reception front end being configured to receive two or more subcarrier signals of the plurality of subcarrier signals, and
the light source frequency control system comprises:
frequency offset monitoring circuit configured to monitor frequency offsets of the respective subcarrier signals received by the optical reception front end and generate frequency offset sum information indicating a sum of frequency offsets of the respective subcarrier signals and frequency offset difference information indicating a difference of the frequency offsets of the respective subcarrier signals; and
light source frequency control circuit configured to control at least one of a light source frequency of the transmitting-side system and a light source frequency of the receiving-side system based on the frequency offset sum information and the frequency offset difference information.

2. The optical communications system according to claim 1, wherein the light source frequency control circuit controls the light source frequency of the receiving-side system so that the frequency offset indicated by the frequency offset sum information is canceled.

3. The optical communications system according to claim 1, wherein
regarding a first subcarrier signal of the respective subcarrier signals received by the optical reception front end, the light source frequency control circuit controls the light source frequency of the transmitting-side system so that it is shifted in a direction opposite to the frequency offset indicated by the frequency offset difference information, and regarding a second subcarrier signal of the respective subcarrier signals received by the optical reception front end that is different from the first subcarrier signal, the light source frequency control circuit controls the light source frequency of the transmitting-side system so that it is shifted in the same direction as the frequency offset indicated by the frequency offset difference information.

4. The optical communications system according to claim 1, further comprising frequency shift circuit configured to apply, based on a channel spacing of the plurality of subcarrier signals wavelength-multiplexed in the transmitting-side system, frequency shifts corresponding to the respective subcarrier signals received by the optical reception front end to the subcarrier signals, wherein the frequency offset monitoring circuit monitors the frequency offsets of the respective subcarrier signals to which the frequency shifts have been applied.

5. The optical communications system according to claim 1, wherein the light source frequency control system further comprises bit error monitoring circuit configured to monitor a bit error rate obtained during demodulation of the respective subcarrier signals in the receiving-side system, and the light source frequency control circuit controls the light source frequency of the transmitting-side system based on a result of the monitoring performed by the bit error monitoring circuit so that the channel spacing of the respective subcarrier signals becomes narrow in the transmitting-side system.

6. The optical communications system according to claim 5, wherein when the bit error rate does not deteriorate from a predetermined value, the light source frequency control circuit controls the light source frequency of the transmitting-side system so that the channel spacing becomes narrow, and when the bit error rate has deteriorated to a predetermined value or higher, the light source frequency control circuit controls the light source frequency of the transmitting-side system so that the channel spacing becomes wide.

7. The optical communications system according to claim 1, wherein the light source frequency control system further comprises spectrum monitoring circuit configured to estimate the channel spacing of the respective subcarrier signals received by the optical reception front end from signal spectrums of the respective subcarrier signals in the receiving-side system, and the light source frequency control circuit controls the light source frequency of the transmitting-side system based on the estimated channel spacing so that the channel spacing of the respective subcarrier signals becomes narrow in the transmitting-side system.

8. An optical frequency control method comprising:

receiving, in a receiving-side system, a plurality of subcarrier signals wavelength-multiplexed and transmitted by a transmitting-side system by using an optical reception front end, the number of the optical reception front end being smaller than the number of the wavelength-multiplexed subcarrier signals;

causing each of the optical reception front end to receive two or more subcarrier signals of the plurality of subcarrier signals;

monitoring frequency offsets of the respective subcarrier signals received by the optical reception front end and generating frequency offset sum information indicating a sum of frequency offsets of the respective subcarrier signals and frequency offset difference information indicating a difference of the frequency offsets of the respective subcarrier signals; and controlling at least one of a light source frequency of the transmitting-side system and a light source frequency of the receiving-side system based on the frequency offset sum information and the frequency offset difference information.

9. The optical frequency control method according to claim 8, wherein the light source frequency of the receiving-side system is controlled so that the frequency offset indicated by the frequency offset sum information is canceled.

10. The optical frequency control method according to claim 8, wherein regarding a first subcarrier signal of the subcarrier signals received by the optical reception front end, the light source frequency of the transmitting-side system is controlled so that it is shifted in a direction opposite to the frequency offset indicated by the frequency offset difference information, and regarding a second subcarrier signal of the subcarrier signals received by the optical reception front end which is different from the first subcarrier signal, the light source frequency of the transmitting-side system is controlled so that it is shifted in the same direction as the frequency offset indicated by the frequency offset difference information.

11. The optical frequency control method according to claim 8, wherein frequency shifts corresponding to the respective subcarrier signals received by the optical reception front end are applied, based on a channel spacing of the plurality of subcarrier signals wavelength-multiplexed in the transmitting-side system, to the subcarrier signals, and the frequency offsets of the respective subcarrier signals to which the frequency shifts have been applied are monitored.

12. The optical frequency control method according to claim 8, wherein a bit error rate obtained during demodulation of the respective subcarrier signals in the receiving-side system is monitored, and a light source frequency of the transmitting-side system is controlled based on a result of the monitoring of the bit error rate so that the channel spacing of the respective subcarrier signals becomes narrow in the transmitting-side system.

13. The optical frequency control method according to claim 12, wherein when the bit error rate does not deteriorate from a predetermined value, the light source frequency of the transmitting-side system is controlled so that the channel spacing becomes narrow, and when the bit error rate has deteriorated to a predetermined value or higher, the light source frequency of the transmitting-side system is controlled so that the channel spacing becomes wide.

14. The optical frequency control method according to claim 8, wherein
- the channel spacing of the respective subcarrier signals received by the optical reception front end is estimated from signal spectrums of the respective subcarrier signals in the receiving-side system, and
- the light source frequency of the transmitting-side system is controlled based on the estimated channel spacing so that the channel spacing of the respective subcarrier signals becomes narrow in the transmitting-side system.

* * * * *